(12) United States Patent
Park et al.

(10) Patent No.: US 10,805,914 B2
(45) Date of Patent: Oct. 13, 2020

(54) METHOD FOR RECEIVING DOWNLINK CONTROL INFORMATION IN WIRELESS COMMUNICATION SYSTEM SUPPORTING UNLICENSED BAND, AND DEVICE FOR SUPPORTING SAME

(71) Applicant: LG Electronics Inc., Seoul (KR)

(72) Inventors: Hanjun Park, Seoul (KR); Seonwook Kim, Seoul (KR); Suckchel Yang, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 11 days.

(21) Appl. No.: 16/090,076

(22) PCT Filed: Mar. 30, 2017

(86) PCT No.: PCT/KR2017/003467
§ 371 (c)(1),
(2) Date: Sep. 28, 2018

(87) PCT Pub. No.: WO2017/171422
PCT Pub. Date: Oct. 5, 2017

(65) Prior Publication Data
US 2019/0124627 A1   Apr. 25, 2019

Related U.S. Application Data

(60) Provisional application No. 62/454,010, filed on Feb. 2, 2017, provisional application No. 62/398,530, filed
(Continued)

(51) Int. Cl.
*H04W 56/00* (2009.01)
*H04W 72/04* (2009.01)
(Continued)

(52) U.S. Cl.
CPC .......... *H04W 72/042* (2013.01); *H04L 5/001* (2013.01); *H04L 5/0053* (2013.01); *H04W 16/14* (2013.01);
(Continued)

(58) Field of Classification Search
CPC ... H04W 72/042; H04W 76/11; H04W 5/001; H04W 5/0053; H04W 16/14;
(Continued)

(56) References Cited

U.S. PATENT DOCUMENTS

2009/0209247 A1* 8/2009 Lee ...................... H04L 5/0007
455/422.1
2012/0236812 A1* 9/2012 Chen .................... H04L 1/1685
370/329
(Continued)

OTHER PUBLICATIONS

International Search Report in International Application No. PCT/KR2017/003467, dated Jun. 28, 2017, 14 pages (with English Translation).
(Continued)

*Primary Examiner* — Sai Ming Chan
(74) *Attorney, Agent, or Firm* — Fish & Richardson P.C.

(57) ABSTRACT

Disclosed in the present invention are: a method for transmitting and receiving a downlink signal between a terminal and a base station in a Licensed Assisted Access (LAA) system in which the base station or the terminal transmits a Listen-Before-Talk (LBT) based signal; and a device for supporting the same. Specifically, disclosed in the present invention are:
a method for allowing a terminal to novelly define a search space to be monitored, in order to receive the downlink control channel corresponding to a specific aggregation level and, on the basis of this, transmitting and receiving the
(Continued)

downlink signal between the terminal and the base station; and a device supporting the same.

12 Claims, 12 Drawing Sheets

Related U.S. Application Data on Sep. 23, 2016, provisional application No. 62/384,206, filed on Sep. 7, 2016, provisional application No. 62/383,614, filed on Sep. 6, 2016, provisional application No. 62/376,420, filed on Aug. 18, 2016, provisional application No. 62/370,723, filed on Aug. 4, 2016, provisional application No. 62/344,973, filed on Jun. 2, 2016, provisional application No. 62/344,379, filed on Jun. 1, 2016, provisional application No. 62/338,459, filed on May 18, 2016, provisional application No. 62/330,227, filed on May 1, 2016, provisional application No. 62/316,525, filed on Mar. 31, 2016, provisional application No. 62/315,115, filed on Mar. 30, 2016.

(51) Int. Cl.
*H04L 5/00* (2006.01)
*H04W 76/11* (2018.01)
*H04W 16/14* (2009.01)
*H04W 74/08* (2009.01)

(52) U.S. Cl.
CPC ... *H04W 72/0446* (2013.01); *H04W 72/0453* (2013.01); *H04W 74/0816* (2013.01); *H04W 76/11* (2018.02); *H04L 5/0007* (2013.01); *H04L 5/0094* (2013.01)

(58) Field of Classification Search
CPC .......... H04W 72/0446; H04W 74/0816; H04L 5/0007; H04L 5/0094
USPC ....................................................... 370/329
See application file for complete search history.

(56) References Cited

U.S. PATENT DOCUMENTS

| | | |
|---|---|---|
| 2013/0163543 A1 | 6/2013 | Freda et al. |
| 2014/0029561 A1* | 1/2014 | Kim ................... H04W 72/042 370/329 |
| 2014/0044000 A1 | 2/2014 | Charbit et al. |
| 2015/0271691 A1 | 9/2015 | Lee et al. |
| 2017/0195999 A1* | 7/2017 | Feng .................. H04W 72/042 |

OTHER PUBLICATIONS

"3rd Generation Partnership Project; Technical Specification Group Radio Access Network; Evolved Universal Terrestrial Radio Access (E-UTRA); Physical layer procedures (Release 13)," 3GPP TS 36.213 V13.1.0 (Mar. 2016), 217 pages.

Alcatel-Lucent Shanghai Bell, Alcatel-Lucent, "Downlink control signaling in LAA," 'R1-157017', 3GPP TSG RAN WG1 Meeting #83, Anaheim, USA, Nov. 15-22, 2015, 7 pages.

* cited by examiner (a)

(b)

METHOD FOR RECEIVING DOWNLINK CONTROL INFORMATION IN WIRELESS COMMUNICATION SYSTEM SUPPORTING UNLICENSED BAND, AND DEVICE FOR SUPPORTING SAME

CROSS-REFERENCE TO RELATED APPLICATIONS

This application is a National Stage application under 35 U.S.C. § 371 of International Application No. PCT/KR2017/003467, filed on Mar. 30, 2017, which claims the benefit of U.S. Provisional Application No. 62/454,010, filed on Feb. 2, 2017, U.S. Provisional Application No. 62/398,530, filed on Sep. 23, 2016, U.S. Provisional Application No. 62/384,206, filed on Sep. 7, 2016, U.S. Provisional Application No. 62/383,614, filed on Sep. 6, 2016, U.S. Provisional Application No. 62/376,420, filed on Aug. 18, 2016, U.S. Provisional Application No. 62/370,723, filed on Aug. 4, 2016, U.S. Provisional Application No. 62/344,973, filed on Jun. 2, 2016, U.S. Provisional Application No. 62/344,379, filed on Jun. 1, 2016, U.S. Provisional Application No. 62/338,459, filed on May 18, 2016, U.S. Provisional Application No. 62/330,227, filed on May 1, 2016, U.S. Provisional Application No. 62/316,525, filed on Mar. 31, 2016, and U.S. Provisional Application No. 62/315,115, filed on Mar. 30, 2016. The disclosures of the prior applications are incorporated by reference in their entirety.

TECHNICAL FIELD

Following description relates to a wireless communication system supporting an unlicensed band, and more particularly, to a method for a user equipment to receive downlink control information in a wireless communication system supporting an unlicensed band and apparatuses supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Task

When a user equipment receives downlink control information from a base station via an unlicensed band, an object of the present invention is to newly define a search space to be monitored by the user equipment and provide a method for the user equipment to receive downlink control information by monitoring the newly defined search space.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method for a UE to receive downlink control information from a base station in a wireless communication system supporting an unlicensed band and apparatuses therefor.

To achieve these and other advantages and in accordance with the purpose of the present invention, as embodied and broadly described, according to one embodiment, a method of receiving downlink control information, which is received by a user equipment from a base station in a wireless communication system supporting an unlicensed band includes configuring a search space for receiving a downlink signal from the base station via a first unlicensed band, and receiving downlink control information by monitoring the configured search space. In this case, a search space for a specific aggregation level included the configured search space can be determined based on the maximum number of candidates among the numbers of candidates of a downlink control channel for the specific aggregation level according to all downlink control information (DCI) formats set to one or more unlicensed bands among unlicensed bands including the first unlicensed band.

To further achieve these and other advantages and in accordance with the purpose of the present invention, according to a different embodiment, a user equipment receiving a downlink signal from a base station in a wireless communication system supporting an unlicensed band includes a receiving unit, a transmitting unit, and a processor configured to operate in a manner of being connected with the receiving unit and the transmitting unit, the processor configured to configure a search space for receiving a downlink signal from the base station via a first unlicensed band, the processor configured to receive downlink control information by monitoring the configured search space. In this case, a search space for a specific aggregation level included the configured search space can be determined based on the maximum number of candidates among the numbers of candidates of a downlink control channel for the specific aggregation level according to all downlink control information (DCI) formats set to one or more unlicensed bands among unlicensed bands including the first unlicensed band.

In this case, if the downlink control channel corresponds to a physical downlink control channel (PDCCH), the search space for the specific aggregation level included the configured search space can be determined based on the maximum number of candidates among the numbers of PDCCH candidates for the specific aggregation level according to all DCI formats set to one or more second unlicensed bands having a carrier indicator smaller than the first unlicensed band.

Specifically, if the downlink control channel corresponds to a physical downlink control channel (PDCCH), the search space for the specific aggregation level included the configured search space can be determined based on a value of the sum of the maximum number of candidates among the numbers of PDCCH candidates for the specific aggregation level according to all DCI formats set to all second unlicensed bands having a carrier indicator smaller than the first unlicensed band.

Specifically, the search space for the specific aggregation level included the configured search space is determined based on a value determined according to an equation in the following.

$$\sum_{k=0}^{n_{CI}-1} M_k^{(L)}$$ [Equation]

In this case, $n_0$ indicates a carrier indicator for the first unlicensed band, and $M_k^{(L)}$ can indicate the maximum number of candidates among the numbers of PDCCH candidates of which an aggregation level corresponds to L according to all DCI formats set to a second unlicensed band having a carrier indicator k.

And, if the downlink control channel corresponds to an enhanced physical downlink control channel (EPDCCH), the search space for the specific aggregation level included the configured search space can be determined based on the maximum number of candidates among the numbers of PDCCH candidates for the specific aggregation level according to all DCI formats set to all unlicensed bands including the first unlicensed band.

Specifically, the search space for the specific aggregation level included the configured search space is determined based on $M_{p,NEW}^{(L)}$ determined according to an equation in the following.

$$M_{p,NEW}^{(L)} = \max\{M_{p,0}^{(L)}, M_{p,1}^{(L)} \ldots M_{p,n_{CI}}^{(L)}\}$$ [Equation]

In this case, $n_0$ MAX indicates a maximum value capable of being indicated by a carrier indicator, and $M_{p,k}^{(L)}$ can indicate the maximum number of candidates among the numbers of EPDCCH candidates of which an aggregation level corresponds to L according to all DCI formats set to an unlicensed band having a carrier indicator k.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

As is apparent from the above description, the embodiments of the present disclosure have the following effects.

According to the present invention, a user equipment can more easily receive downlink control information by making search spaces set to carriers different from each other not to be overlapped in a wireless access system supporting an unlicensed band.

More specifically, it is able to minimize a scheduling restriction by making search spaces set to cross-scheduled carriers different from each other not to be overlapped.

Effects obtainable from the present invention are non-limited by the above mentioned effect. And, other unmentioned effects can be clearly understood from the following description by those having ordinary skill in the technical field to which the present invention pertains. That is, effects which are not intended by the present invention may be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE MODE FOR INVENTION

Figure 1:
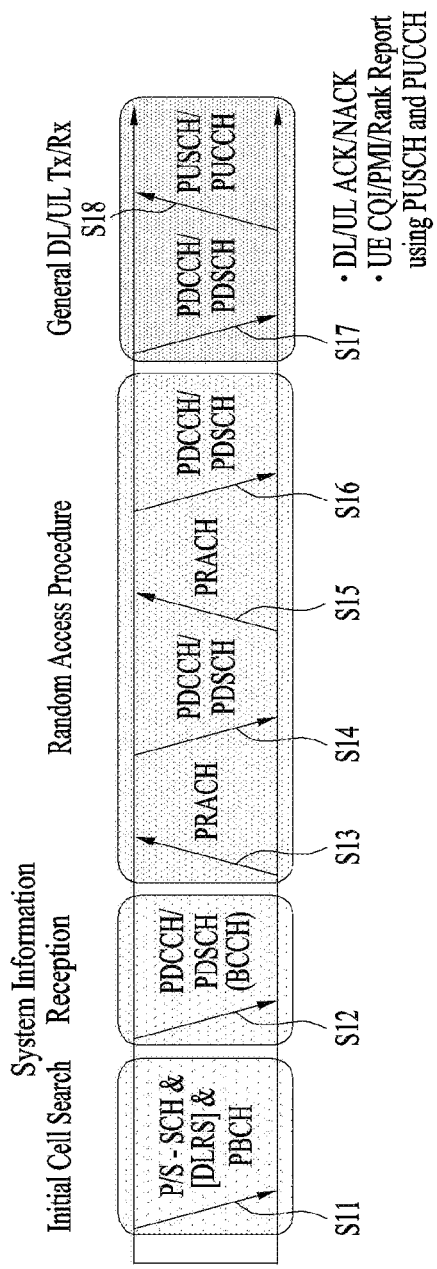
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), and CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
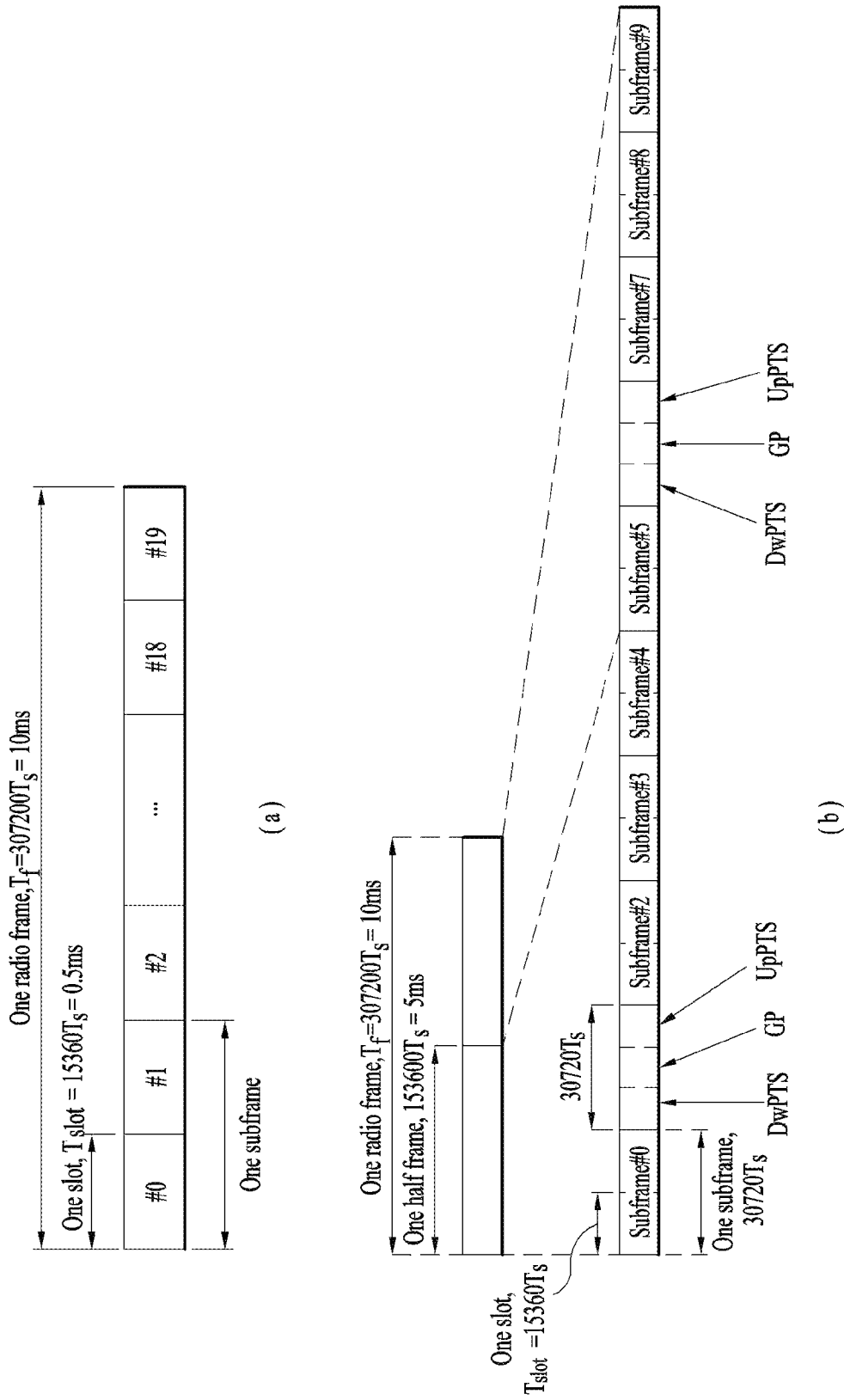
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended Cyclic prefix in downlink | | |
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
|---|---|---|---|---|---|---|
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
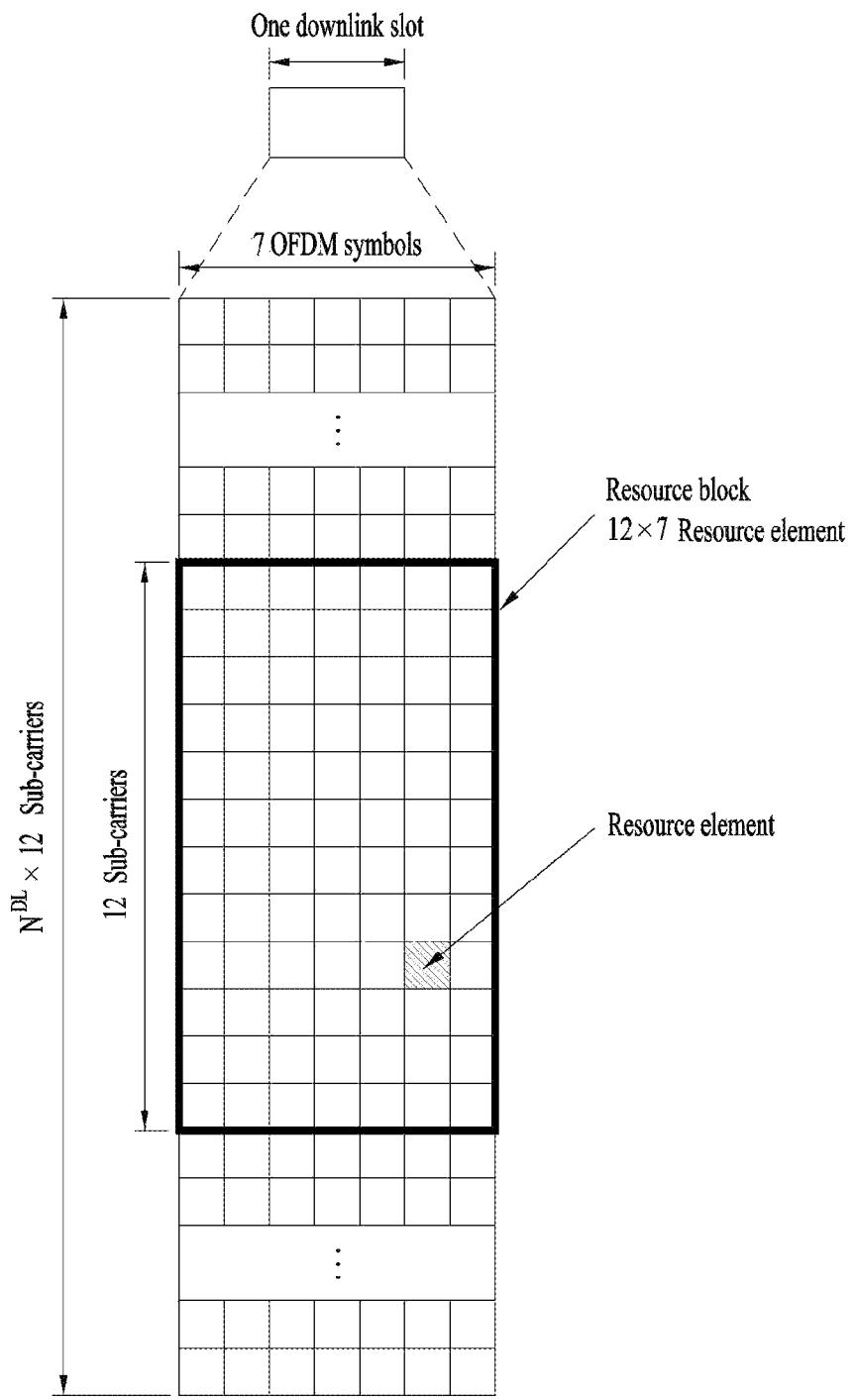
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A structure of an uplink slot may be identical to a structure of a downlink slot.

Figure 4:
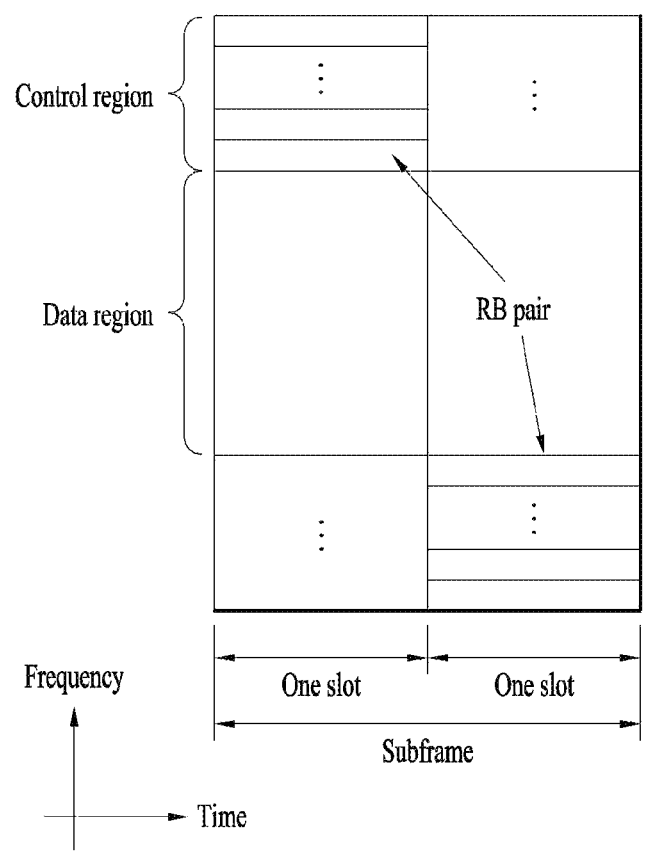
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe is allocated to a PUCCH for a UE. The RBs of the RB pair occupy different subcarriers in two slots. Thus it is said that the RB pair frequency-hops over a slot boundary.

Figure 5:
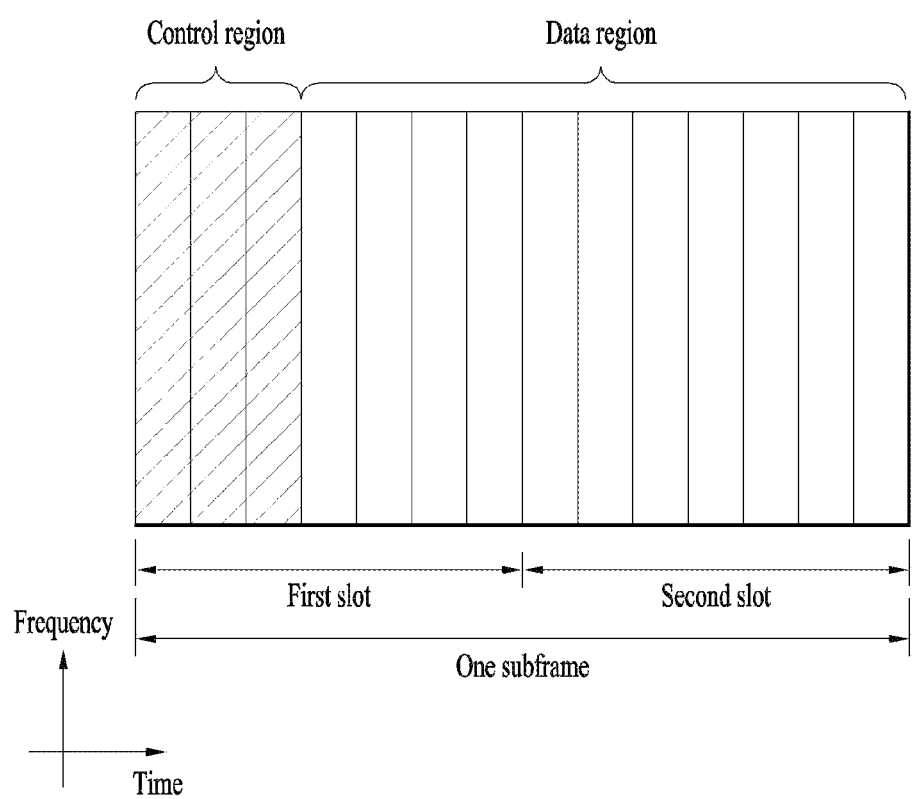
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. LTE-U System 2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 6:
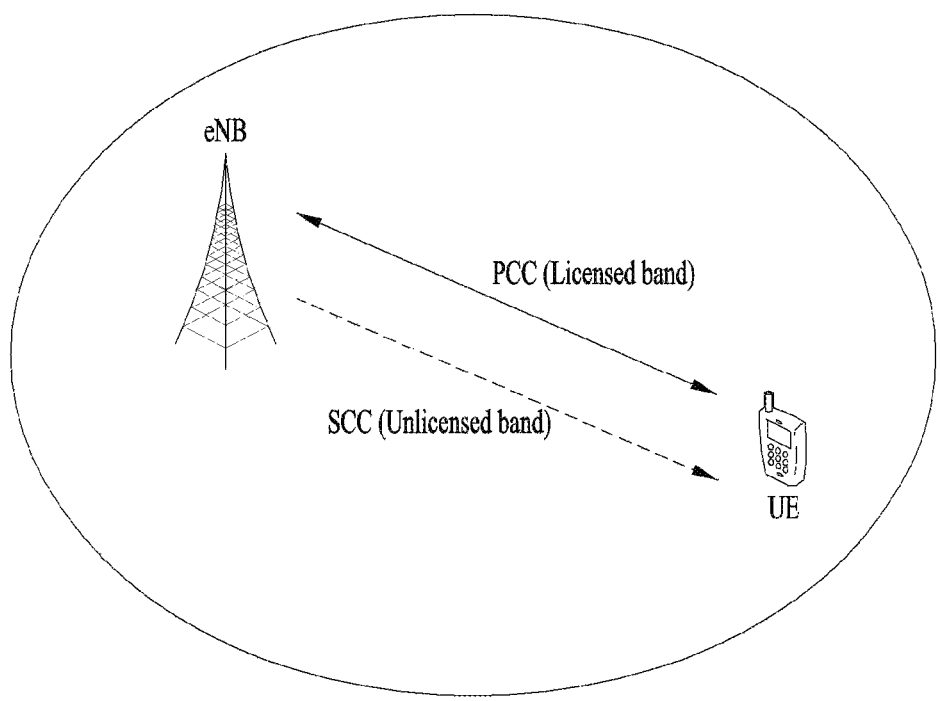
FIG. 6 is a diagram illustrating an exemplary CA environment supported in an LTE-Unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
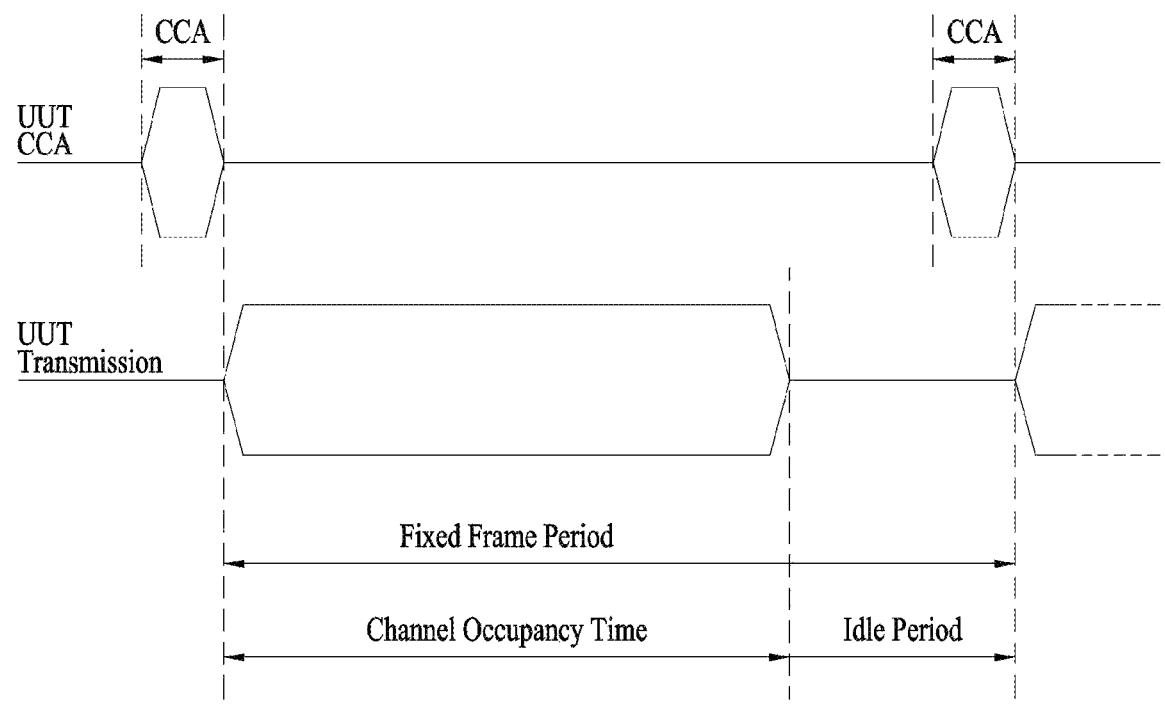
FIG. 7 is a diagram illustrating an exemplary Frame Based Equipment (FBE) operation as one of Listen-Before-Talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
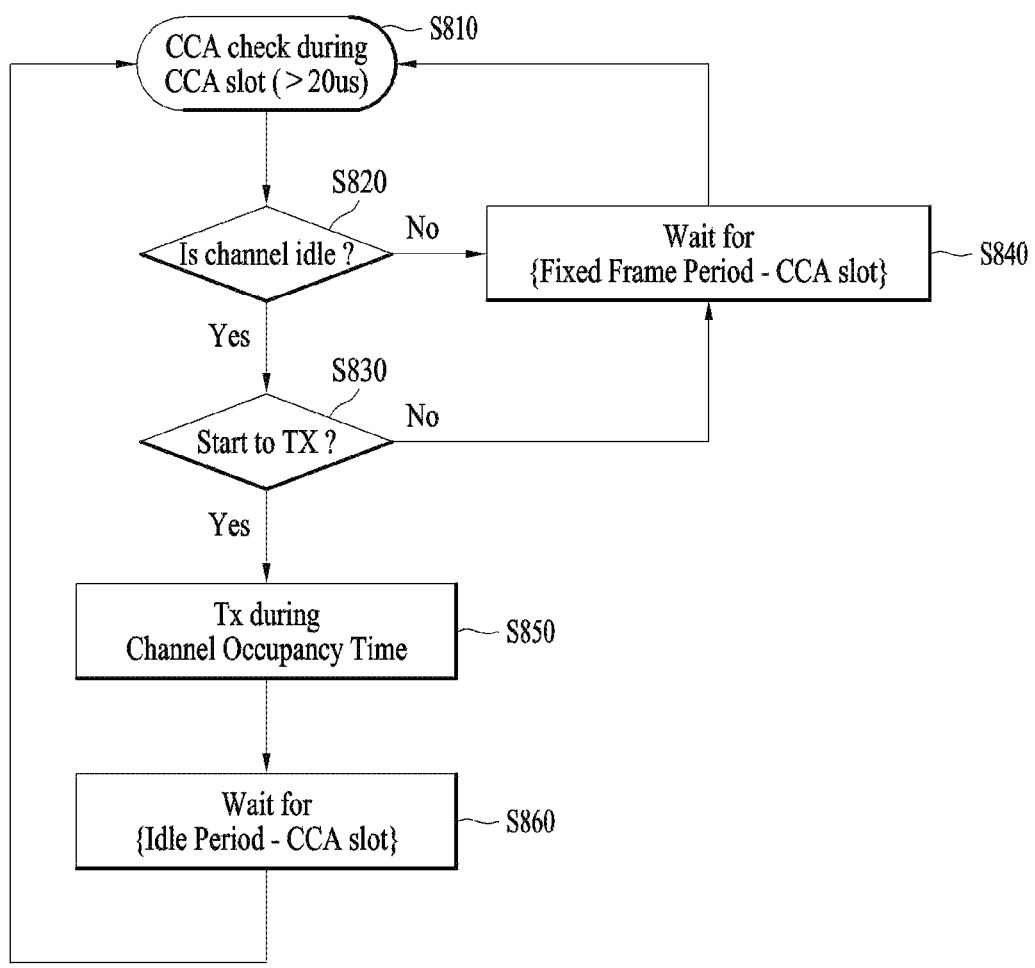
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot [S810]. If the channel is idle [S820], the communication node performs data transmission (Tx) [S830]. If the channel is busy, the communication node waits for a time period calculated by subtracting the CCA slot from a fixed frame period, and then resumes CCA [S840].

The communication node transmits data during the channel occupancy time [S850]. Upon completion of the data transmission, the communication node waits for a time period calculated by subtracting the CCA slot from the idle period [S860], and then resumes CCA [S810]. If the channel is idle but the communication node has no transmission data, the communication node waits for the time period calculated by subtracting the CCA slot from the fixed frame period [S840], and then resumes CCA [S810].

Figure 9:
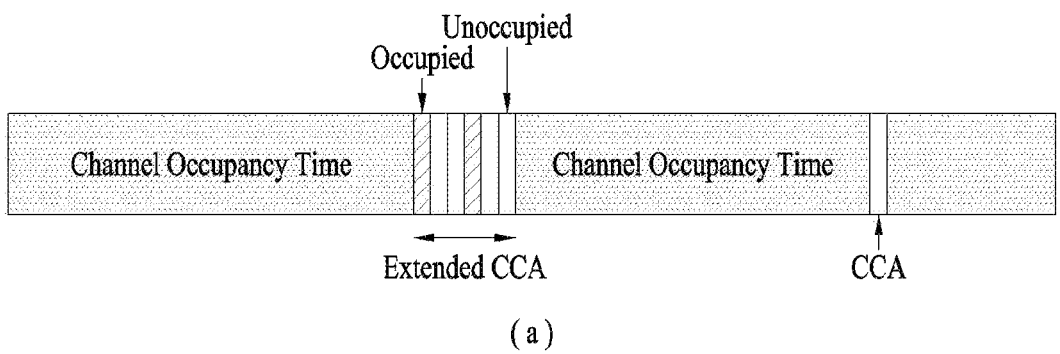
FIG. 9 is a diagram illustrating an exemplary Load Based Equipment (LBE) operation as one of the LBT operations.
Figure 9:
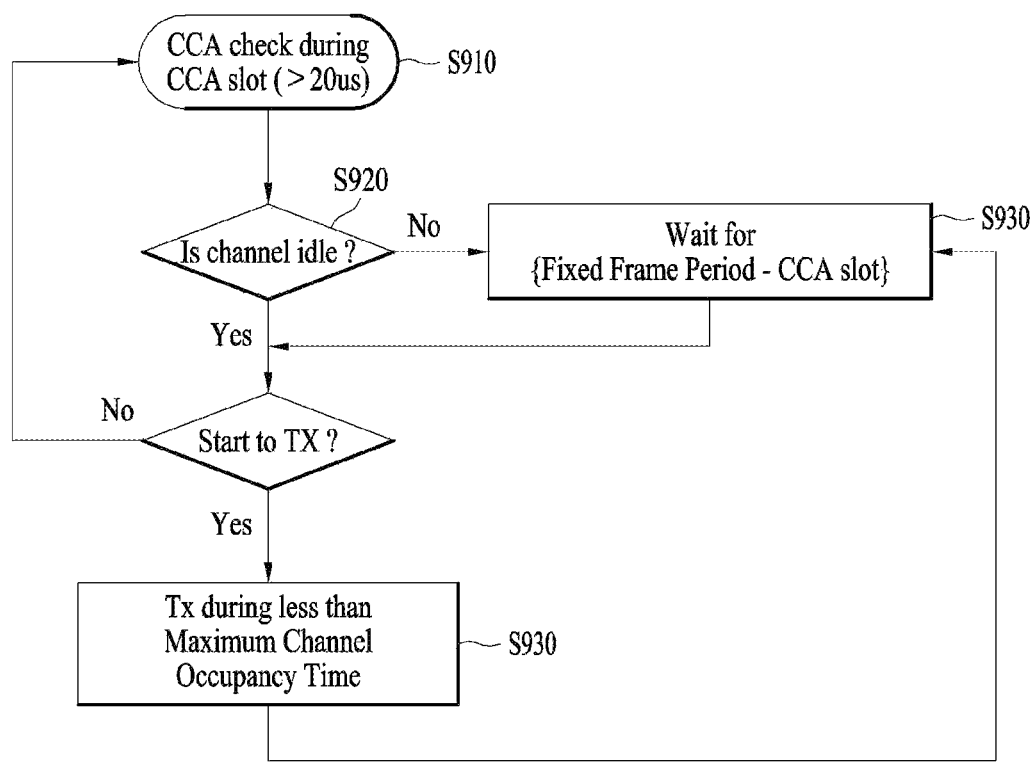

FIG. 9 is a view illustrating an exemplary LBE operation as one of the LBT operations.

Referring to FIG. 9(a), in LBE, the communication node first sets q (q∈{4, 5, . . . , 32}) and then performs CCA during one CCA slot.

FIG. 9(b) is a block diagram illustrating the LBE operation. The LBE operation will be described with reference to FIG. 9(b).

The communication node may perform CCA during a CCA slot [S910]. If the channel is unoccupied in a first CCA slot [S920], the communication node may transmit data by securing a time period of up to (13/32)q ms [S930].

On the contrary, if the channel is occupied in the first CCA slot, the communication node selects N (N∈{1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms [S940].

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission. 2.4 Measuring and Reporting RRM LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
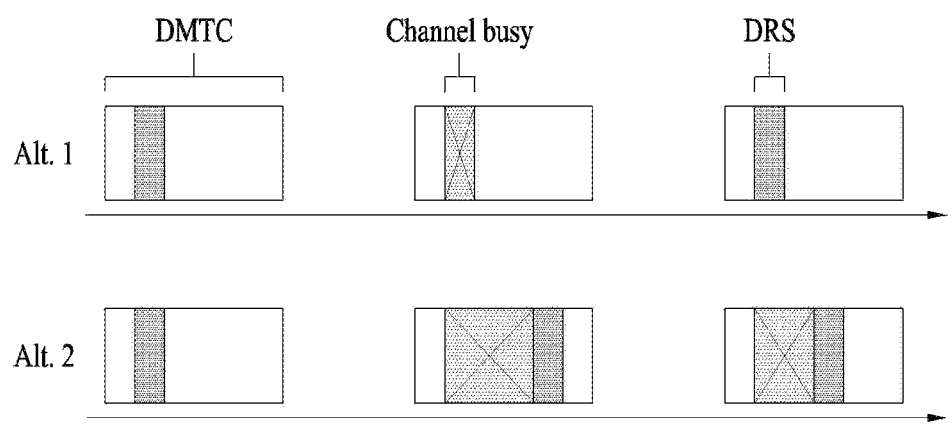
FIG. 10 is a diagram for explaining methods of transmitting a DRS supported in an LAA system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
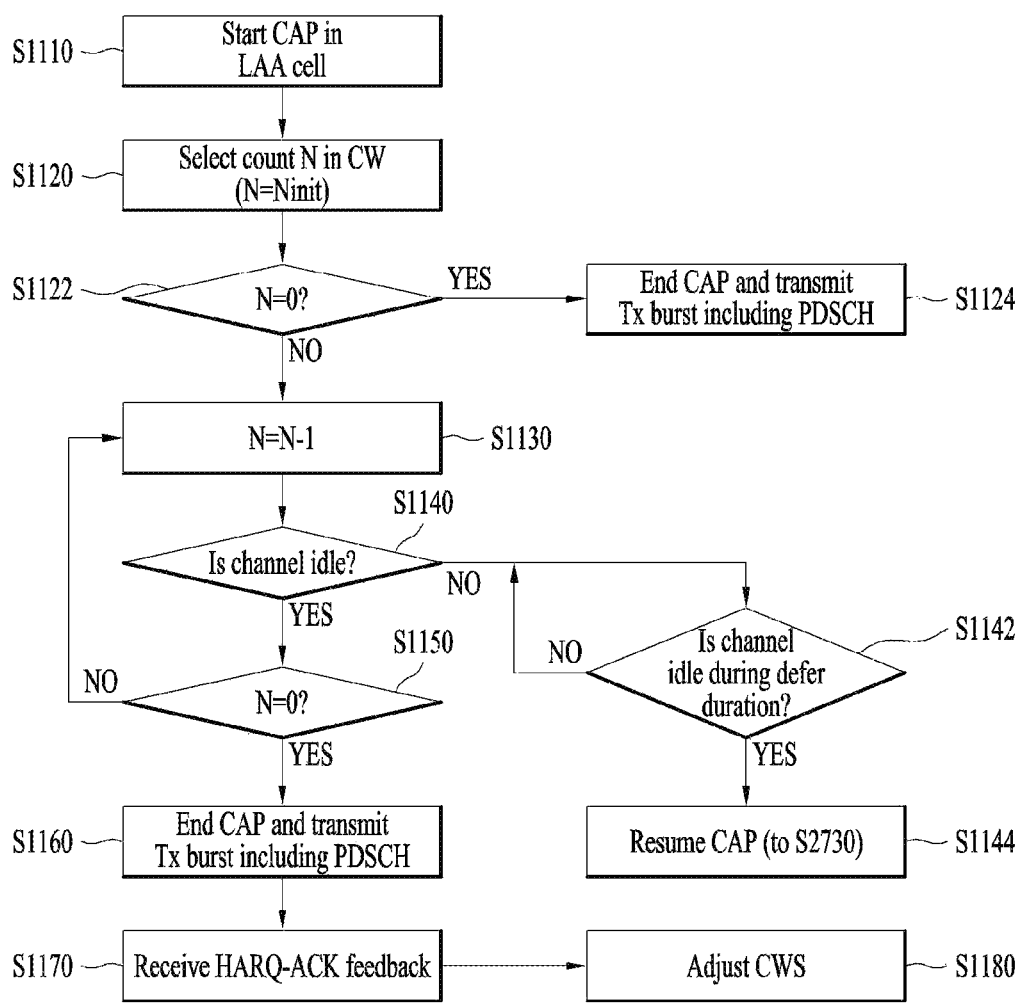
FIG. 11 is a flowchart for explaining CAP and CWA.

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N from a contention window (CW). In this case, the N is configured by an initial value Ninit [S1120]. The Ninit is randomly selected from among values ranging from 0 to $CW_p$.

Subsequently, if the back-off counter value (N) corresponds to 0 [S1122], the base station terminates the CAP and performs Tx burst transmission including PSCH [S1124]. On the contrary, if the back-off value is not 0, the base station reduces the back-off counter value by 1 [S1130].

The base station checks whether or not a channel of the LAA Scell(s) is in an idle state [S1140]. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the UE [S1180]. In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M(M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

3. Proposed Embodiment

When a base station or a UE performs LBT (listen-before-talk)-based signal transmission in a wireless communication system consisting of the base station and the UE, the present invention proposes a detail downlink transmission method.

According to the present invention, a base station or a UE should perform LBT to transmit a signal on an unlicensed band. When the base station or the UE transmits a signal, it is necessary to make signal interference not to be occurred with different communication nodes such as Wi-Fi, and the like. For example, according to Wi-Fi standard, a CCA threshold value is regulated by −62 dBm and −82 dBm for a non-Wi-Fi signal and a Wi-Fi signal, respectively. In particular, if an STA (station) or an AP (access point) senses a signal received with power (or energy) equal to or greater than −62dBm rather than Wi-Fi, the STA or the AP does not perform signal transmission.

In this case, it may be difficult to always guarantee DL transmission of an eNB or UL transmission of a UE on an unlicensed. Hence, a UE operating on the unlicensed band may maintain access with a different cell operating on a licensed band to stably control mobility, RRM (radio resource management) function, and the like. In the present invention, for clarity, a cell accessed by a UE on the unlicensed band is referred to as a U-Scell (or LAA Scell) and a cell accessed by the UE on the licensed band is referred to as a Pcell. As mentioned in the foregoing description, a scheme of performing data transmission/reception on the unlicensed band using a combination with the licensed band is generally called LAA (licensed assisted access).

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3,7} |
| 2 | 1 | 7 | 15 | 3 ms | {7,15} |
| 3 | 3 | 15 | 63 | 8 or 10 ms | {15,31,63} |

TABLE 2-continued

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 4 | 7 | 15 | 1023 | 8 or 10 ms | {15,31,63,127, 255,511,1023} |

As shown in Table 2, in Rel-13 LAA system, 4 channel access priority classes are defined in total. And, a length of a defer period, a CWS, MCOT (maximum channel occupancy time), and the like are defined according to each of the channel access priority classes. Hence, when an eNB transmits a downlink signal via an unlicensed band, the eNB performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 2, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

Figure 12:
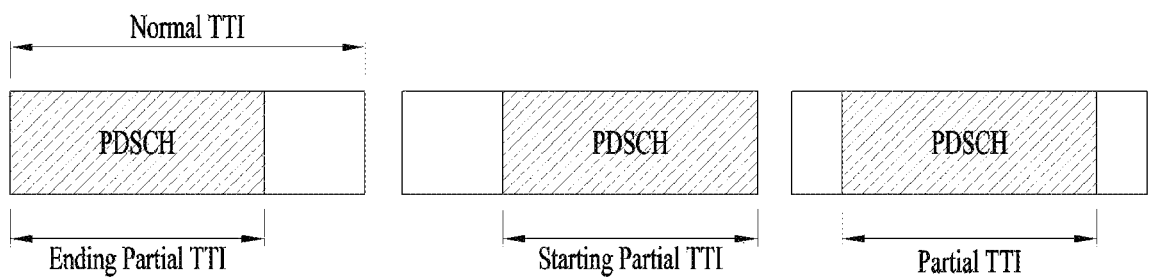
FIG. 12 is a diagram illustrating a partial TTI or a partial subframe applicable to the present invention.

FIG. 12 is a diagram illustrating a partial TTI or a partial subframe applicable to the present invention.

In Rel-13 LAA system, MCOT is utilized as much as possible when DL Tx burst is transmitted. In order to support consecutive transmission, a partial TTI, which is defined as DwPTS, is introduced. The partial TTI (or partial subframe) corresponds to a section in which a signal is transmitted as much as a length shorter than a legacy TTI (e.g., 1 ms) when PDSCH is transmitted.

In the present invention, for clarity, a starting partial TTI or a starting partial subframe corresponds to a form that a part of symbols positioned at the fore part of a subframe are emptied out. An ending partial TTI or an ending partial subframe corresponds to a form that a part of symbols positioned at the rear part of a subframe are emptied out. (On the contrary, an intact TTI is referred to as a normal TTI or a full TTI.)

FIG. 12 illustrates various types of the aforementioned partial TTI. The first drawing of FIG. 12 illustrates an ending partial TTI (or subframe) and the second drawing illustrates a starting partial TTI (or subframe). The third drawing of FIG. 12 illustrates a partial TTI (or subframe) that a part of symbols positioned at the fore part and the rear part of a subframe are emptied out. In this case, when signal transmission is excluded from a normal TTI, a time section during which the signal transmission is excluded is referred to as a transmission gap (TX gap).

Although the present invention is explained on the basis of a DL operation in FIG. 12, the present invention can also be identically applied to a UL operation. For example, a partial TTI structure shown in FIG. 12 can be applied to a form of transmitting PUCCH or PUSCH as well.

Meanwhile, in case of a self-carrier scheduling for performing LAA UL transmission in LTE release-14 system, a base station transmits a UL grant for transmitting PUSCH to an LAA Scell. In this case, it is necessary for the base station to additionally perform DL LBT to transmit the UL grant. Hence, such a problem as decrease of a PUSCH transmission probability, occurrence of channel congestion (due to the use of a time resource for transmitting control information or a control channel), and the like may occur.

In particular, when LAA UL transmission is supported by self-carrier scheduling, it may be preferable to minimize a time resource for transmitting a UL grant. In this point of view, discussion on a multi-subframe scheduling method for scheduling a plurality of UL subframes in a single DL subframe is in progress. The present invention proposes a multi-subframe scheduling method considering UE complexity and expandability. In the following, although a proposed operation in LTE system (or LAA) according to an embodiment of the present invention is explained as an example, proposed operations of the present invention can be extensively applied to a random wireless communication system supporting a multi-subframe scheduling scheme.

3.1. Method 1

When a base station sets a DCI format (DCI format A) for single subframe scheduling and a DCI format (DCI format B) for multi-subframe scheduling to a UE, the UE can perform BD (blind decoding) on the two DCI formats as follows.

(1) The UE performs BD in a search space for the DCI format A and then (if there is no detected DCI) the UE performs BD in a search space(s) for the DCI format B.

(2) The UE performs BD in a search space(s) for the DCI format B and then (if there is no detected DCI) the UE performs BD in a search space for the DCI format A.

In this case, the UE may assume that DCI corresponding to one DCI format among the two DCI formats is transmitted in every subframe. In particular, the UE assumes that the base station does not transmit the DCI format A and the DCI format B at the same time. Or, the base station may set a limit on scheduling to make DCI for a single DCI format among the DCI format A and the DCI format B to be transmitted to the UE.

More specifically, the base station defines a DCI format (DCI format A) for single subframe scheduling and a DCI format (DCI format B) for multi-subframe scheduling, respectively. And, the base station can differently design DCI sizes for the two DCI formats. In this case, it is necessary for the UE to have capability capable of detecting the two DCI formats in every subframe. In this case, an operation of simultaneously indicating single subframe scheduling and multi-subframe scheduling via a single subframe is not preferable in consideration of complexity of the base station and the UE.

Hence, the UE may assume that DCI corresponding to one DCI format among the two DCI formats is transmitted only. For example, if the UE detects DCI for single subframe scheduling, the UE may not detect DCI for multi-subframe scheduling. Although the UE detects DCI for multi-subframe scheduling, the UE can determine that the DCI is invalid. By doing so, the UE can reduce unnecessary BD and prevent ambiguity of a UE operation due to miss detection of the DCI format B in a situation that DCI for the DCI format A has already been detected.

And, when the base station configures the UE to receive a plurality of DCI formats, an order of performing BD to be performed by the UE can be promised in advance or can be configured via higher layer signaling. In this case, the UE may assume that the base station transmits DCI for a single DCI format only among a plurality of the DCI formats.

As a variation of the method 1, when the base station sets a DCI format (DCI format A) for single subframe scheduling and a DCI format (DCI format B) for multi-subframe scheduling to the UE, the UE may follow both scheduling indication for the DCI format A and scheduling indication for the DCI format B. In this case, the UE may attempt to detect both DCI configured by the DCI format A (DCI to which the DCI format A is applied) and DCI configured by the DCI format B and follow both of the detected scheduling indications.

More specifically, assume that the base station is able to indicate multi-subframe scheduling for 4 subframes using DCI configured by the DCI format B and indicate single subframe scheduling using DCI configured by the DCI format A. In this case, if the base station intends to perform scheduling on 5 subframes, the base station transmits two DCI for performing multi-subframe scheduling on 4 subframes to the UE to indicate the UE to perform scheduling on 5 subframes. However, if multi-subframe scheduling DCI for scheduling 4 subframes is transmitted to perform scheduling on a $5^{th}$ subframe, it may cause unnecessary DCI overhead.

In particular, according to the variation of the method 1, the base station transmits two DCI according to each of two DCI formats including a DCI format for single subframe scheduling and a DCI format for multi-subframe scheduling. And, the UE detects both single subframe scheduling DCI and multi-subframe scheduling DCI in every subframe and can follow the detected scheduling indications of the base station.

Additionally, in the method 1, the DCI format A (e.g., DCI format 0A) for single subframe scheduling may correspond to a DCI format that indicates single subframe scheduling (SSF) irrespective of a TM (transmission mode) or a transmission scheme. For example, in LTE system according to embodiments of the present invention, although a UE is configured to receive MSF (multi-subframe scheduling) DCI, the UE may follow both scheduling indication of the MSF DCI and scheduling indication of SSF DCI by simultaneously receiving a DCI format 0 indicating single subframe scheduling and a DCI format (e.g., DCI format 0A), which is transformed from the DCI format 0 in accordance with LAA, irrespective of a TM.

In this case, the DCI format 0 or the DCI format 0A can be designed to have a DCI size identical to a DCI size of a DCI format 1A indicating a fall back operation of DL transmission. Then, a UE identically performs BD (blind detection) on the DCI format 1A and the DCI format 0 (or DCI format 0A). Since it is able to identify each of the DCI formats via flag bits included in the two DCI formats, additional BD is not required compared to a case of performing MSF DCI.

In this case, if the DCI format 1A and the DCI format 0 (or DCI format 0A) are transmitted in a different cell, it may be difficult to perform the abovementioned operation. Hence, a UE can perform the operation according to the variation of the method 1 only when DL assignment (e.g., DCI format 1A) and a UL grant (e.g., DCI format 0 or DCI format 0A) are transmitted in the same cell. For example, when both DL and UL are cross-carrier scheduled from a licensed cell or both DL and UL are self-carrier scheduled in LAA Scell, the UE can perform the operation.

In general, if a DCI size of the DCI format 1A (or a different DCI format) and a DCI size of the DCI format 0A are identically controlled via zero bit padding or the like, it may have a merit in that it is able to reduce BD of a UE. In this case, if a bandwidth of a cell in which the DCI 1A scheduling the same cell is transmitted is different from a bandwidth of a cell in which the DCI format 0A is transmitted, since the number of bits for performing resource allocation is differentiated, too much bit padding is required to match sizes of the two DCI formats, thereby reducing efficiency.

Hence, when a bandwidth of a cell in which a DCI format 1A (or a different DCI format) scheduling the same cell is transmitted is identical to a bandwidth of a cell in which a DCI format 0A is transmitted, an embodiment of the present invention proposes a method of reducing BD of a UE by matching sizes of the two DCI formats. In other word, when a bandwidth of a cell in which a DCI format 0A (or a different DCI format) is transmitted is identical to a bandwidth of a cell scheduled by the DCI format 0A (or a different DCI format), it is able to reduce BD of a UE by matching a size of the DCI format 0A (or a different DCI format) with a size of a DCI format 1A of a cell in which the DCI format 0A (or a different DCI format) is transmitted. The method above is explained in a broad sense in the following. Although sizes of two DCI formats are different from each other, if a difference between the sizes is equal to or less than a specific number of bits, the sizes can be matched via bit padding. The method above can also be applied to a case of matching a size of a DCI format 0A corresponding to single subframe scheduling DCI or a DCI format 0B corresponding to multi-subframe scheduling DCI with a size of a DCI format 1A (or a different DCI format).

3.2. Method 2

When a base station sets a DCI format (e.g., DCI format B) for multi-subframe scheduling to a UE, the base station can transmit multiple DCIs (defined by a single RNTI (Radio Network Temporary Identifier) value) corresponding to the DCI format B in a single subframe within a single search space.

Hence, the UE may expect that multiple DCIs according to the DCI format B are to be received.

For example, when the base station defines a DCI format (DCI format B) for performing multi-subframe scheduling and indicates multi-subframe scheduling using single DCI to which the DCI format B is applied, the DCI should support the maximum number of multiple subframes to be scheduled by the base station.

However, as mentioned in the foregoing description, if multi-subframe scheduling is supported by the single DCI, DCI can be inefficiently used. For example, assume that DCI is defined to support multi-subframe scheduling for maximum 8 subframes. In this case, if a base station intends to schedule 2 or 3 subframes only, a DCI size, which is defined (or designed) in consideration of 8 subframes, is too big compared to necessary scheduling information.

Hence, the present invention proposes a method of indicating multi-subframe scheduling for the N*M number of subframes by transmitting the N number of DCIs indicating multi-subframe scheduling for the M number of subframes in a single subframe. In this case, the DCIs indicating multi-subframe scheduling for the M number of subframes can share a single search space. For example, a base station designs a DCI format B scheduling the maximum 4 subframes and transmits two DCIs to which the DCI format B is applied to a single search space in a single subframe to indicate a UE to perform multi-subframe scheduling on 8 subframes.

3.3. Method 3

(Similar to the aforementioned method 2) If multiple DCIs indicating multi-subframe scheduling for PUSCH exist in a single search space, a UE can infer UL timing offset for PUSCH transmission indicated by DCI using a CRC (Cyclic Redundancy Check) mask applied to the DCI (or flag information included in the DCI).

In this case, each of the multiple DCIs may have a different CRC mask (or flag information included in the DCI).

If UL timing indication information exists in DCI, UL timing offset can be additionally applied to the UL timing indication information.

More specifically, similar to the aforementioned method 2, when multiple DCIs indicating multi-subframe scheduling for PUSCH exists within a single search space in a single subframe, it is able to differently configure UL timing at which PUSCH corresponding to DCI indicating the multi-subframe scheduling is transmitted.

Meanwhile, in LTE system according to an embodiment of the present invention, it may consider a method of transmitting DCI including flexible UL timing information to a UE to perform LAA UL transmission. In this case, UL timing at which PUSCH corresponding to the multi-subframe scheduling DCI is transmitted can also be indicated by information included in DCI. In this case, since multiple DCIs indicating the multi-subframe scheduling are mainly utilized for scheduling consecutive UL TX bursts, it may consider a method of separately indicating a UL timing offset value for each multi-subframe scheduling as a method of reducing signaling overhead.

For example, if multiple DCIs indicating the multi-subframe scheduling include flags distinguished from each other in a single subframe in DCI, it may be able to apply UL timing offset according to each flag. In particular, a base station configures a reference UL timing offset in advance and a UL timing offset to be finally applied can be defined in proportion to the flag value.

Figure 13:
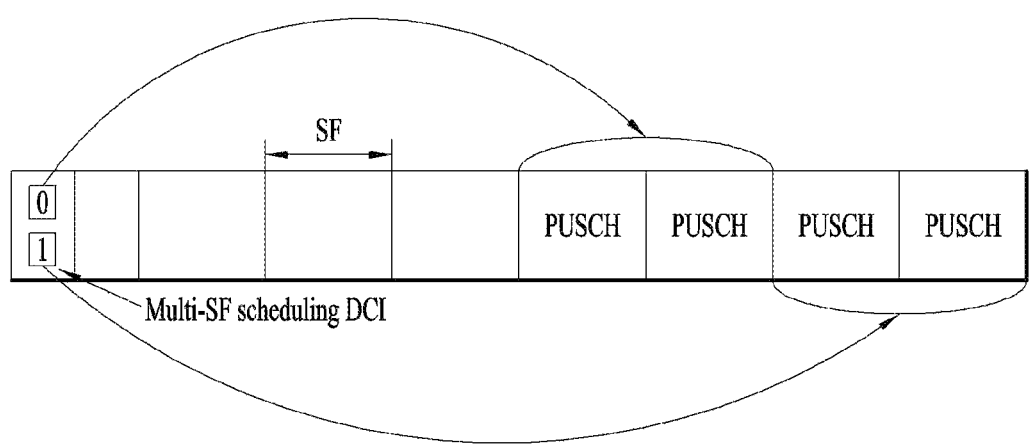
FIG. 13 is a diagram illustrating a configuration according to a method 2 of the present invention.

FIG. 13 is a diagram illustrating a configuration according to a method 2 of the present invention.

As shown in FIG. 13, a base station determines a reference UL timing offset by 4 and a UE calculates multi-subframe scheduling DCI of which a flag value corresponds to '0' by 4+0*4=4 as UL timing. The UE calculates multi-subframe scheduling DCI of which a flag value corresponds to '1' by 4+1*4=8 as UL timing.

Or, multiple DCIs indicating the multi-subframe scheduling may have a UL timing offset value which is defined according to a CRC mask. In this case, if UL timing indication information exists in the multi-subframe sched-uling DCI, it may be able to additionally apply UL timing offset in addition to the UL timing indication information.

3.4. Method 4

When a base station sets a DCI format (DCI format B) for multi-subframe scheduling to a UE, multiple DCIs corresponding to the DCI format B can be transmitted within a plurality of search spaces (defined by a plurality of RNTI values) (e.g., search space per DCI) in a single subframe.

In this case, DCIs following the DCI format B can receive a configuration of a search space per DCI.

More specifically, as mentioned earlier in the method 2, if multiple DCIs share a single search space, the search space may have an insufficient space depending on a DCI size. For example, if DCI indicating multi-subframe scheduling has an aggregation level 8 consisting of 8 CCEs (Control Channel Elements), maximum 2 DCIs can be transmitted on the basis of a PDCCH search space of LTE release-13 system. As a variation of the method 2, when multiple DCIs indicating multi-subframe scheduling for PUSCH are transmitted in a single subframe, it may consider a method of configuring a search space according to each of the multiple DCIs. For example, a base station configures the number of DCI format B-based DCIs capable of indicating multi-subframe scheduling by N and may be able to assign an RNTI value to each of the N number of DCIs. In this case, a search space for DCI can be defined according to an RNTI value set to the DCI. The method 4 has a merit in that it is able to easily expand a search space.

As an additional operation of the method 4, a base station can set UL timing offset for PUSCH transmission indicated by each multi-subframe scheduling DCI to a UE by associating the UL timing offset with the RNTI value.

Or, as an additional operation of the method 4, the base station can set a single C-RNTI (common-RNTI) to the UE only. In this case, the base station can set an additional RNTI (or seed value or an offset value for C-RNTI) to the UE to allocate a search space. In this case, a search space per DCI can be defined according to an additional RNTI (or seed value or C-RNTI or offset value for C-RNTI) configured by the base station.

In addition, if a DCI size of a DCI format A for single subframe scheduling is identical to a DCI size of a DCI format B for multi-subframe scheduling, the aforementioned methods 2, 3, and 4 can be applied between single subframe scheduling DCI and multi-subframe scheduling DCI.

For example, the single subframe scheduling DCI and the multi-subframe scheduling DCI coexist in a single search space and the two DCIs can be distinguished from each other via a flag or a CRC mask included in DCI. (Example of modifying the methods 2 and 3)

Or, single subframe scheduling DCI and multi-subframe scheduling DCI can be respectively transmitted in search spaces distinguished from each other. (Example of modifying the method 4)

3.5. Method 5

When a base station is able to indicate flexible UL timing for PUSCH transmission to a UE via a UL grant (or common DCI), if the UE receives a plurality of UL grants indicating UL scheduling for the same subframe, the UE may operate as follows.

(1) The UE determines that all indications included in a previously received UL grant are invalid and may follow indication of a newly received UL grant.

(2) The UE may follow information of the latest UL grant, which has indicated transmission of a UL subframe.

(3) The UE may follow information of a first UL grant, which has indicated transmission of a UL subframe.

Or, most preferably, the base station may set a limit on scheduling to make a UL grant not to be overridden.

More specifically, when a base station is able to indicate flexible UL timing for PUSCH transmission via a UL grant (or common DCI), a UE can receive a plurality of UL grants indicating UL scheduling for the same subframe. In this case, the UE may fail to detect DCI. Hence, it is necessary for the base station to detect a UL grant used for performing PUSCH transmission from among a plurality of the UL grants. However, if the base station duplicately schedules PUSCH to the same UL subframe using a plurality of UL grants, the UE determines it as the base station has an intention of performing BD. The UE can perform PUSCH transmission according to information of the latest UL grant.

Or, the UE assumes that UL scheduling overridden by the base station is valid only when an indication according to a previous UL grant is missed. In this case, the UE may follow information of a UL grant determined as the first UL grant by the UE for a corresponding UL subframe. The base station can perform BD to determine a UL grant used for transmitting PUSCH in an order scheduled by the base station.

3.6. Method 6

When a base station performs multi-subframe scheduling via a single UL grant, the UL grant can include information described in the following according to all UL subframes to be scheduled.

(1) Transmission gap (TX gap) related information (e.g., information on whether or not a TX gap exists according to a subframe, a length of a TX gap, or a position of a TX gap)

(2) LBT parameter related information (2)-1) LBT type (e.g., single CCA slot based LBT or Cat.4 LBT)

(2)-2) CW size or back-off counter value

When a base station schedules transmission of a plurality of subframes to a UE via single DCI, UL subframes in the multi-subframe scheduling are not always configured by a single UL transmission burst. For example, when the base station performs multi-subframe scheduling on 4 subframes, the base station can schedule two UL transmission bursts, each of which is configured by two UL subframes. In this case, although the base station performs multi-subframe scheduling on a plurality of subframes via single DCI, it is necessary for the base station to set a transmission gap or LBT parameter information to scheduling target subframes according to a subframe.

3.7. Method 7

When a base station configures single transmission gap-related information or LBT parameter-related information within a single UL grant, a UE may assume that UL subframes indicated by the single UL grant are included in the same UL transmission burst.

According to the aforementioned method 6, although it is able to support flexible scheduling of a base station, since a transmission gap or LBT parameter information is configured according to a subframe, signaling overhead within DCI can be increased.

According to the method 7 of the present invention, if a base station indicates multi-subframe scheduling using a single UL grant, it may be able to configure all scheduled UL subframes to be included in the same UL transmission burst. In this case, the base station configures single transmission gap-related information or LBT parameter-related information in the UL grant for performing multi-subframe scheduling and a UE can apply the information on the basis of a set of the scheduled UL subframes. In this case, the base station can indicate information on UL subframes in which data transmission is actually performed via the UL grant for performing the multi-subframe scheduling and the UE can apply a transmission gap on the basis of the set of the UL subframes in which data transmission is actually performed.

For example, if the base station indicates data transmission actually transmitted in 3 UL subframes and an ending transmission gap of a length of one symbol via DCI capable of indicating multi-subframe scheduling for maximum 4 UL subframes, a UE may assume that the ending transmission gap is applied to the last UL subframe among the 3 UL subframes in which data is actually transmitted.

3.8. Method 8

When a base statin transmits multiple DCIs to be received by a UE in a subframe within a single search space for multi-subframe scheduling, the base station can increase the number of PDCCH candidates for a specific CCE aggregation level within the search space.

For example, in LTE system according to an embodiment of the present invention, a search space exists in a manner of being defined in a unit of CCE (control channel element) to detect PDCCH. In this case, it is able to transmit DCI using the N number of CCEs in the search space. The number of CCEs capable of transmitting the DCI is referred to as an aggregation level. PDCCH candidates to be detected by a UE exist in the search space according to an aggregation level.

In LTE system to which the present invention is applied, 6, 6, 2, and 2 PDCCH candidates are respectively configured for aggregation levels 1, 2, 4, and 8 in a UE-specific search space. However, if multiple DCIs are transmitted in a single search space according to a proposed method of the present invention, the maximum number of DCIs capable of being transmitted can be restricted for a specific aggregation level. For example, since an aggregation level 8 has two PDCCH candidates, a base station can transmit maximum 2 DCIs to a user equipment to perform multi-subframe scheduling. If each of the DCIs indicates a single subframe to be scheduled, the base station can indicate multi-subframe scheduling to be performed on two subframes only.

In order to indicate multi-subframe scheduling to be performed on more subframes, the present invention proposes a method of increasing the number of PDCCH candidates for a specific aggregation level. Specifically, a base station can indicate an increase rate of the number of PDCCH candidates to a UE according to an aggregation level via higher layer signaling such as RRC. In this case, the base station can configure BD of the entire UEs not to be increased. For example, if the base station respectively configures 8, 8, 0, and 0 PDCCH candidates for aggregation levels 1, 2, 4, and 8, the base station can make the number of BD performed by the UE to be maintained while indicating multi-subframe scheduling to be performed on the maximum 8 subframes.

In addition, the base station can increase the number of PDCCH candidates for a high aggregation level. For example, when eCA (enhanced CA) scheme is supported in LTE release-13 system according to an embodiment of the present invention, one decrease rate selected from among [0%, 33%, 66%, and 100%] is indicated via RRC signaling (signaling of a size of 2 bits) according to an aggregation level to reduce BD (blind detection) burden of the UE and the decrease rate is applied to the basic number of PDCCH candidates. In particular, the number of new PDCCH candidates is configured by the multiplication of the basic number of PDCCH candidates and a specific ratio R. When a base station intends to increase the number of PDCCH candidates for a specific aggregation level, according to the present invention, the base station may apply one selected from [$R_0, R_1, \ldots R_{N-1}$] (N number of ratio values) to the number of basic PDCCH candidates using N bits (N>3) according to an aggregation level via RRC signaling. In this case, the $R_X$(X=0, 1, 2, ..., N−1) corresponds to specific percentage values and a part of the values may have values corresponding to 0%, 33%, 66%, 100%, and 200%.

As a different method, it may be able to configure a ratio corresponding to each of the $2^M$ number of states to be differently interpreted via RRC signaling of a size of M bits according to a DCI format or an aggregation level without changing the number of bits of RRC signaling. For example, when an aggregation level is high (e.g., aggregation level 4 or 8), a specific value (e.g., 66%) can be interpreted as a value (e.g., 200%) greater than the specific value in a ratio set given by [0%, 33%, 66%, and 100%]. In particular, a base station can configure a value resulted from applying a ratio selected from among [0%, 33%, 66%, and 100%] (or [0%, 200%, 66%, and 100%]) to the basic number of PDCCH candidates via information of a size of 2 bits (RRC signaling) for aggregation levels 4 and 8 to be used as the number of new PDCCH candidates. Or, the base station can indicate a value selected from among [0%, 50%, 100%, and 200%] to be applied.

In LTE release-13 system, when a control channel corresponds to PDCCH and a control channel corresponds to EPDCCH (Enhanced PDCCH), the number of (E)PDCCH candidates for the same aggregation level may vary. In particular, when a base station is able to configure a BD count according to a DCI format or an aggregation level (via higher layer signaling), preferably, the base station can configure a BD count according to a DCI format or an aggregation level for a case that a control channel corresponds to PDCCH and a case that a control channel corresponds to EPDCCH, respectively.

And, when a base station is able to configure a BD count according to a DCI format or an aggregation level (via higher layer signaling), it may be able to set a limit to satisfy at least one of conditions described in the following.

(1) When the maximum BD count is configured according to a cell, it may be able to configure the sum of BD counts for all DCI formats in a cell not to exceed the maximum BD count according to the cell. For example, the maximum BD count for a USS (user-specific search space) according to a cell can be configured by 32 or 48 (in case of additionally detect a DCI format 4 due to the configuration of UL TM2) in order not to exceed a value required by a legacy LTE system.

(2) When the maximum BD count is configured according to a DCI format, it may be able to configure the number of (E)PDCCH candidates for a DCI format not to exceed the maximum BD count according to the DCI format. For example, the maximum BD count for a USS according to a DCI format can be configured by 16 in order not to exceed a value required by a legacy LTE system.

3.9. Method 9

When a base station sets a DCI format (DCI format A) for performing single subframe scheduling and a DCI format (DCI format B) for performing multi-subframe scheduling to a UE, the base station can allocate (E)PDCCH candidates included in a search space defined by the same hashing function in a manner that the (E)PDCCH candidates are distinguished from each other (mutually exclusive) for the DCI format A and the DCI format B. By doing so, a duplicated (E)PDCCH candidate is not allocated to the UE.

In this case, allocation of the (E)PDCCH candidates for the DCI format A and the DCI format B may follow a predetermined scheme or can be configured via higher layer signaling.

For example, in LTE system according to an embodiment of the present invention, when detection is performed on PDCCH in a USS (user-specific search space), a PDCCH candidate is determined by a function of a C-RNTI value. In particular, the number of PDCCH candidates can be configured by 6/6/2/2 in response to a CCE aggregation level 1/2/4/8. In this case, as mentioned earlier in the method 1, if it is necessary for a UE to receive both a DCI format for performing single subframe scheduling and a DCI format for performing multi-subframe scheduling, a BD count of the UE may increase.

Hence, as a method of reducing the BD count (UE BD) of the UE, it may consider a method of allocating the total PDCCH candidates by dividing the PDCCH candidates into two DCI formats (i.e., DCI format A and DCI format B) while the total BD counts of the UE is fixed. In this case, if the UE receives the DCI formats (i.e., DCI format A and DCI format B) different from each other at the same, it is preferable to allocate PDCCH candidates mutually exclusive according to a DCI format. For example, when the number of PDCCH candidates corresponds to 6/6/2/2 in response to a CCE aggregation level 1/2/4/8, PDCCH candidates corresponding to a CCE aggregation level 1/2 are allocated only in the DCI format A and PDCCH candidates corresponding to a CCE aggregation level 4/8 can be allocated only in the DCI format B.

3.10. Method 10

When a base station sets a DCI format (DCI format A) for performing single subframe scheduling and a DCI format (DCI format B) for performing multi-subframe scheduling to a UE and the DCI format A and the DCI format B share a search space defined by the same hashing function, the base station or the UE can independently configure a starting CCE index for a PDCCH candidate according to a CCE aggregation level. Or, the base station or the UE can independently configure a starting CCE index for a PDCCH candidate according to a DCI format.

In this case, a start point of a CCE index for a PDCCH candidate according to a CCE aggregation level can be configured by a predetermined scheme or can be configured via higher layer signaling.

For example, when a DCI format (DCI format A) of single subframe scheduling DCI and a DCI format (DCI format B) of multi-subframe scheduling DCI share a single search space, a size of the DCI format A is configured by a size of about 40 bits on the basis of a DCI format 0 of LTE system and a size of the DCI format B can be configured by a size of about 60 bits. In other word, the size of the DCI format B can be configured to be bigger than the size of the DCI format A.

In this case, it is preferable to apply a CCE aggregation level 4 or 8 to the DCI format B in the aspect of a coding rate. In this case, if a base station intends to transmit two DCIs including the DCI format A and the DCI format B to a UE or DCI for the DCI format B is transmitted by a CCE aggregation level 8, most of PDCCH candidates for CCE aggregation levels 1, 2, and 4 can be blocked. In order to solve the problem above, a starting CCE index according to a CCE aggregation level can be independently configured.

3.11. Method 11

When a base station sets a DCI format (MSF DCI) for performing multi-subframe scheduling to a UE and the maximum number of subframes (NMAx) capable of being scheduled by the MSF DCI is configured via higher layer signaling (e.g., RRC signaling, etc.), if the NMAx corresponds to M(>1), the UE can detect both MSF DCI corresponding to $N_{MAX}$=M and MSF DCI corresponding to $N_{MAX}$=1 in every subframe. In this case, a payload size of the MSF DCI corresponding to $N_{MAX}$=1 may be different from a payload size of the MSF DCI corresponding to $N_{MAX}$=M.

More specifically, the base station can set MSF DCI to the UE as a DCI format for performing multi-subframe scheduling. In this case, if the maximum number of subframes ($N_{MAX}$) capable of being scheduled by the MSF DCI corresponds to $N_{MAX}$=M (>1), the base station can indicate the UE to detect not only MSF DCI corresponding to $N_{MAX}$=M but also MSF DCI corresponding to $N_{MAX}$=1 to receive indication of single subframe scheduling. In particular, the UE can utilize the MSF DCI corresponding to $N_{MAX}$=1 as a DCI format for performing single subframe scheduling.

In the following description, for clarity, a DCI format indicating single subframe scheduling for 1 CW (codeword) (or TB (transport block)) and a DCI format indicating single subframe scheduling for 2 CWs (or TBs) are referred to as a DCI format 0A and a DCI format 0B, respectively. A DCI format indicating multi-subframe scheduling for 2 CWs (or TBs) and a DCI format indicating multi-subframe scheduling for 2 CWs (or TBs) are referred to as a DCI format 4A and a DCI format 4B, respectively.

3.12. Method 12

When a base station is able to indicate a UE to monitor a specific DCI format group ($S_0$) according to a DCI format (in accordance with a carrier) (via higher layer signaling), the base station can inform a specific UE of a DCI format subgroup(s) ($S_1$, $S_0 \supset S_1$). For example, the DCI format subgroups ($S_1$) can be defined in advance. Or, the base station configures a specific DCI format subgroup ($S_1$) using random elements included in the specific DCI format group ($S_0$) and can inform the UE of the specific DCI format subgroup.

In this case, the base station can indicate at least one of information described in the following according to the DCI format subgroup ($S_1$).

(1) Information on whether or not DCI sizes are unified in the DCI format subgroup ($S_1$)

If the DCI sizes are unified, a UE may assume that DCI sizes of DCI formats included in a group are unified by the maximum DCI size.

Or, if DCI sizes are unified, a UE may assume that a flag bit for distinguishing DCI formats belonging to a group is included in DCI.

(2) Information on BD reduction/increase (or BD count) (according to a cell/aggregation level) commonly applied to DCI formats belonging to a DCI format subgroup ($S_1$)

(3) Information on whether or not DCI is monitored commonly applied to DCI formats belonging to a DCI format subgroup ($S_1$)

(4) Information on whether or not a DCI format subgroup ($S_1$) is valid

In this case, information on whether or not a DCI format subgroup is valid may correspond to information indicating whether or not BD reduction/increase or DCI monitoring enable/disable is applied in a unit of a DCI format subgroup ($S_1$). In particular, if the configuration above is not applied, BD reduction/increase or DCI monitoring enable/disable can be individually applied according to a DCI format.

In this case, the $S_0$ can include a DCI format (e.g., DCI format 1A) for performing fallback.

And, the $S_0$ can include DCI formats 0A, 0B, 4A, and 4B.

And, DCI sizes of DCI formats included in the $S_1$ can be unified by the biggest DCI size in the $S_1$.

In LTE release-14 LAA system according to an embodiment of the present invention, 4 DCI formats (i.e., DCI format 0A, DCI format 0B, DCI format 4A, and DCI format 4B) indicating single/multi-subframe scheduling are considered to perform UL transmission. In this case, a base station can indicate a UE to perform monitoring according to each of the DCI formats. A part of the 4 DCI formats can be designed to have a similar DCI size. If DCI sizes of two or more DCI formats are unified, since the UE is able to detect (or support) a plurality of the DCI formats, it may be able to have a merit in that complexity of the UE is reduced.

In this view point, the present invention proposes a method for a base station to unify DCI sizes by grouping DCI formats according to a group, indicate reduction/increase of a BD count according to the group, and indicate whether or not DCI is monitored in a unit of a group.

For example, in LTE system, a DCI format 1A for indicating a DL fallback operation and a DCI format 0A for indicating single subframe scheduling can be configured (or designed) to have almost the same DCI size. In particular, if both DL scheduling DCI and UL scheduling DCI are transmitted in LAA Scell, it is preferable for a base station to unify a DCI size of the DCI format 1A and a DCI size of the DCI format 0A to reduce a BD count of a UE.

And, in LAA Scell, a DCI format 0B for performing UL scheduling and a DCI format 4A can be configured (or designed) to have a similar DCI size. In particular, a base station configures the DCI format 1A and the DCI format 0A as a single group, configures the DCI format 0B and the DCI format 4A as a single group, and informs a UE of whether or not DCI sizes are unified in a specific group. In particular, whether or not a DCI size of the DCI format 1A and a DCI size of the DCI format 0A are unified can be determined according to a DL/UL scheduling combination for LAA Scell. In particular, a UE may assume that the DCI size of the DCI format 1A and the DCI size of the DCI format 0A are unified only when DL/UL scheduling DCIs are transmitted in the same cell (e.g., LAA Scell). In this case, the UE may assume that a BD count per aggregation level for the DCI format 0A is applied in a manner of being similar to that of the DCI format 1A.

In the method 12 according to the present invention, it is not mandatory that DCI sizes in a DCI format subgroup are unified. In order to comprehensively manage BD reduction/increase for DCI formats having a similar DCI size and a usage, BD reduction/increase or whether to monitor DCI can be indicated according to a DCI format subgroup. For example, in the method 12 according to the present invention, it may consider groups described in the following as an example of a DCI format subgroup.

0A/0B/4A group and 4B
0A/0B group and 4B
0A/0B group and 4A/4B
0A/4A group and 0B/4B group In this case, DCI sizes in each group may or may not be unified. If DCI sizes in a group are unified, a DCI format 1A can be added to a group in which a DCI format 0A is included.

As an additional operation of the method 12, when a base station informs a UE of BD reduction/increase (and/or DCI enable/disable information) according to a DCI format or BD reduction/increase (and/or DCI enable/disable information) according to a DCI format (sub)group (via higher layer signaling), the information may correspond to information indicating scheduling in a specific LAA SCell group (or a specific carrier group) and the information commonly applied to DCI formats corresponding to a target of the information.

If the base station is able to indicate the UE to perform BD 0 time on a specific DCI format (or a DCI format group) according to an aggregation level, the base station may not additionally indicate DCI enable/disable indication information on the DCI format (or DCI format group). And, the base station can indicate DCI enable/disable information only when a DCI format group includes two or more elements only. If a DCI format group includes 1 element only, the base station may not indicate the DCI enable/disable information.

3.13. Method 13

When a base station is able to indicate a UE to monitor each of a plurality of DCI formats (according to a carrier) (via higher layer signaling), the base station can apply independent hashing according to each DCI format (or a DCI format group) included in a plurality of the DCI formats at the time of configuring a search space for detecting DCI.

In this case, the independent hashing means that the base station independently configures a search space according to a DCI format. In other word, the configuration above means that a hashing function is different or a seed value applied as an input of a hashing function is different.

For example, in LTE release-14 LAA system, it may consider a case that a base station indicates a UE to monitor all of a DCI format 0A, a DCI format 0B, a DCI format 4A, and a DCI format 4B and transmits the DCI formats at the same time.

In a current LTE system, it is not expected that a UE receives a plurality of DCI formats in a single subframe. Hence, search spaces are designed not to be distinguished from each other according to a DCI format. If an additional operation is not added in the current LTE system, in the example above, it may assume that the base station transmits the DCI format 0A/0B/4A/4B to the UE via the same search space.

However, if a plurality of DCI formats are transmitted in the same search space, a collision may considerably occurs between DCIs. In particular, since LAA system supports an operation of receiving multiple DCIs for a single DCI format, the DCI collision problem may become worse.

Hence, when a base station is able to indicate whether to monitor a plurality of DCI formats according to each DCI format (or DCI format group), the present invention proposes a method of making a search space not to be overlapped between DCI formats by applying independent hashing according to each DCI format (or DCI format group).

As an additional operation of the method 13, when a base station is able to indicate to monitor a plurality of DCI formats, it may consider a method of defining a DCI format group including a part of DCI formats among a plurality of the DCI formats, applying the same hashing to the DCI formats included in the group (or identically applying a starting CCE index to a search space in the group or sharing a search space in the group), and applying independent hashing in a group unit (or independently applying a starting CCE index to a search space in a group unit or configuring an independent search space in a group unit).

For example, when a base station is able to indicate a UE to monitor a DCI format 0A/0B/4A/4B, the base station defines 0A/0B group and 4A/4B group and can apply same hashing according to a group. Or, the base station defines 0A/4A group and 0B/4B group and can independently apply hashing in a group unit.

As a different example, the base station defines 0A/0B/4A group and 4B group and can independently apply hashing in a group unit. In particular, when the base station configures a specific group, the number of DCI formats included in the specific group may correspond to 1.

In the method 13 proposed in the present invention, a specific DCI format can apply hashing identical to DL DCI (or it may identically apply a starting CCE index for a search space in a group or it may be able to share a search space). For example, a base station can apply a starting CCE index for a search space used for a DL DCI format to a DCI format 0A or a DCI format group including the DCI format 0A.

3.14. Method 14

When a base station is able to indicate a UE to monitor each of a plurality of DCI formats for performing UL transmission (according to a carrier) (via higher layer signaling), the base station can sequentially configure a starting CCE index of a search space according to a DCI format (or DCI format group) included in a plurality of the DCI formats at the time of configuring a search space for detecting DCI.

In this case, (in the aspect of configuring a starting CCE index) an offset (or difference) value of a starting CCE index (according to an aggregation level) between two sequential DCI formats (or DCI format groups) can be configured by one of values described in the following.

(1) A predetermined fixed value
(2) The number of CCEs corresponding to the number of PDCCH candidates set to a following DCI format (or DCI format group)
(3) The number of CCEs corresponding to the number of PDCCH candidates capable of being set to a following DCI format (or DCI format group)

In this case, a starting CCE index of a search space for a DCI format (or a DCI format group) to which a starting CCE index is firstly set may follow a hashing result and may be identical to a starting CCE index for DL DCI.

Or, search spaces for a different DCI format can be configured to be sequentially connected on a CCE index (according to an aggregation level) for a plurality of the DCI formats.

More specifically, it may consider a case that a base station indicates a UE to monitor all of DCI formats 0A/0B/4A/4B and transmits the DCI formats in LTE release-14 LAA system. According to current LTE system, since it is expected that a UE does not receive a plurality of DCI formats in a single subframe, search spaces are designed not to be separated from each other according to a DCI format. In particular, if a separate operation is not additionally defined by the UE, in the method above, it may assume that a base station transmits DCI formats 0A/0B/4A/4B to a UE via the same search space.

However, if a plurality of DCI formats are transmitted via the same search space, a collision problem between DCIs may become worse. In particular, since LAA system supports an operation of receiving multiple DCIs for a single DCI format, the DCI collision problem may become worse.

In order to solve the problem above, as mentioned earlier in the method 13, it may consider a method of applying independent hashing according to a DCI format (or a DCI format group). As a more efficient method, it may consider a method of differently configuring a starting CCE index per DCI format (or DCI format group) according to a search space. When a base station is able to indicate whether or not each of a plurality of DCI formats is monitored, the present invention proposes a method of separating search spaces from each other for a DCI format (or a DCI format group) by independently configuring a starting CCE index of a search space according to a DCI format (or a DCI format group). Specifically, the base station sequentially configures a starting CCE index of a search space according to a DCI format (or a DCI format group) and sets an offset to a starting CCE index between two sequential DCI formats (or DCI format groups) (in the aspect of configuring a starting CCE index) to separate search spaces from each other for a DCI format (or DCI format group).

As an additional example of the method 14, the base station defines a DCI format group including a part of DCI formats among a plurality of DCI formats capable of being indicated to be monitored by the base station and can be configured to identically apply a starting CCE index for a search space to a specific group. In this case, the base station may set a different offset value to a starting CCE index for a search space according to a group. For example, when a base station is able to indicate a specific UE to monitor a DCI format 0A/0B/4A/4B, the base station defines a DCI format 0A/0B group and a DCI format 4A/4B group, shares a starting CCE index according to each group, and can set a different offset value to a starting CCE index between the groups.

As a different example, the base station defines a DCI format 0A/4A group and a DCI format 0B/4B group, shares a starting CCE index according to each group, and can set a different offset value to a starting CCE index between the groups.

As a further different example, the base station defines a DCI format 0A/0B/4A group and a DCI format 4B group, shares a starting CCE index according to each group, and can set a different offset value to a starting CCE index between the groups. In other word, among DCI format groups defined by the base station, a specific DCI format group may include one DCI format only.

In this case, hashing identical to DL DCI can be applied to a specific DCI format (or a starting CCE index for a search space is identically applied within a group or a search space is shared). For example, a starting CCE index for a search space applied to a DL DCI format can be applied to a DCI format 0A or a DCI format group including the DCI format 0A.

In the methods 13 and 14, an operation applied in a unit of a DCI format group can be applied in a specific transmission mode (TM) only. For example, in case of a TM supporting a single CW (codeword) only, a UE can apply an operation according to the method 13 and an operation according to the method 14 to a DCI format 0A and 0B, respectively. In case of a TM supporting two CWs, a UE can apply an operation according to the method 13 and an operation according to the method 14 to a first group including a DCI format 0A/4A and a second group including a DCI format 0B/4B, respectively, in a group unit.

The aforementioned methods 13 and 14 can be extensively applied to a plurality of aggregation levels within a single DCI format. More specifically, it may apply independent hashing according to an aggregation level (or an aggregation level group) included in a plurality of the aggregation levels. Or, it may be able to sequentially apply a starting CCE index of a search space according to a plurality of the aggregation levels. In this case, in the latter case, (in the aspect of configuring a starting CCE index) an offset value of a starting CCE index between two sequential aggregation levels (or DCI format groups) can be configured by one of values described in the following.

1) A predetermined fixed value
2) The number of CCEs corresponding to the number of PDCCH candidates set to a following aggregation level (or aggregation level group)
3) The number of CCEs corresponding to the maximum number of PDCCH candidates capable of being set to a following aggregation level (or aggregation level group)

3.15. Method 15

Assume that a base station indicates a blind decoding (BD) increase/decrease rate (according to an aggregation level) for a specific DCI format to a UE using an element of a set including the M number of elements (via higher layer signaling). In this case, when a reference BD count (or the number of reference (E)PDCCH candidates) is configured, the present invention proposes a method of differently configuring the M number of values capable of being applied by the BD increase/decrease rate according to a relative relationship between a BD count (or the number of (E)PDCCH candidates) before the BD increase/decrease rate is applied and the reference BD count (or the number of reference (E)PDCCH candidates) in accordance with an aggregation level.

In this case, the reference BD count (or the number of reference (E)PDCCH candidates) may correspond to a predetermined value or a value configured by a base station via higher layer signaling.

According to an eCA (enhanced CA) scheme in accordance with LTE release-13 system to which the present invention is applicable, it may consider a configuration that a base station indicates a BD decrease rate for the number of reference PDCCH candidates via RRC signaling as information of a size of 2 bits according to an aggregation level to reduce BD burden of a UE. More specifically, according to the eCA scheme, a base station can indicate an element of a set including 4 elements [0%, 33%, 66%, 100%] according to an aggregation level via RRC signaling as a BD decrease rate for the number of reference PDCCH candidates.

However, since LTE release-14 LAA system to which the present invention is applicable supports a scheme that a UE receives multiple DCIs configured by the same DCI format, the number of (E)PDCCH candidates for a specific aggregation level of a DCI format may not be sufficient.

For example, in LAA system, a DCI format indicating UL scheduling for one codeword (CW) is defined as a DCI format 0A. In this case, assume that the DCI format 0A has the number of PDCCH candidates (according to an aggregation level) identical to the number of PDCCH candidates of a DCI format 0 in LTE system. When a UE is able to receive maximum 4 DCIs at the same time in LAA system, since an aggregation level 8 of the DCI format 0A has two PDCCH candidates only, it may have a demerit in that it is unable to completely utilize DCI simultaneous reception capability of the UE.

In order to solve the problem above, it may consider a method that a BD decrease rate in eCA is extensively applied with a BD increase/decrease rate and a BD increase rate is included according to an aggregation level. For example, a base station can indicate a value selected from among [0%, 50%, 100%, 200%] to be applied as a BD increase/decrease rate according to an aggregation level.

However, in this case, it may have a demerit in that width of selection of a BD decrease rate narrows for a specific aggregation level of a DCI format, which already has the sufficient number of PDCCH candidates. Hence, the present invention proposes a method of differently applying a set of candidates (or a set of elements) capable of being applied by a BD increase/decrease rate according to a relative relationship between a BD count (or the number of (E)PDCCH candidates) before a BD increase/decrease rate is applied and a reference BD count (or the number of reference (E)PDCCH candidates) according to a specific aggregation level for a specific DCI format. For example, if a legacy BD count for a specific aggregation level of a specific DCI format is less than a reference BD count, a base station indicates a value selected from among [0%, 50%, 100%, 200%] to be applied as a BD increase/decrease rate. On the contrary, if the legacy BD count is greater than the reference BD count, the base station can indicate a value selected from among [0%, 33%, 66%, 100%] to be applied as a BD increase/decrease rate.

3.16. Method 16

A base station can distinguish a search space for a DCI format for performing DL allocation on a specific UE from a search space (SS) for a DCI format for a UL grant using one or more methods described in the following.

(1) The base station can differently apply a hashing function for determining a search space (SS) of a DCI format for performing DL allocation and a hashing function for determining a search space (SS) of a DCI format for a UL grant. For example, the base station can distinguish search spaces from each other using a different hashing function or an input seed value of a different hashing function.

(2) The base station distinguishes a search space of a DCI format for performing DL allocation from a search space of a DCI format for a UL grant and can sequentially arrange the search spaces. For example, the base station can arrange the SS of the DCI format for the UL grant after the SS of the DCI format for performing DL allocation (according to an aggregation level) on a CCE index. Or, the base station can arrange the SS of the DCI format for performing DL allocation after the SS of the DCI format for the UL grant.

(3) The base station can distinguish a search space of a DCI format for performing DL allocation from a search space of a DCI format for a UL grant by applying a different offset value to a starting CCE index of each of the search spaces.

In LTE release-14 system according to an embodiment of the present invention, it may consider an operation of a UE receiving a plurality of UL grants in a single DL subframe as an operation of LAA operations. Meanwhile, according to LTE release-13 system to which the present invention is applicable, in the aspect of a single UE, an SS of a DCI format for performing DL allocation and an SS of a DCI format for a UL grant can be identically configured. In this case, if a specific UE receives a plurality of UL grants according to an LAA operation, an SS for performing DL allocation may become insufficient. For example, when DL allocation and a UL grant are transmitted in a PDCCH region, a base station can apply an aggregation level 8 not only to a DCI format for performing DL allocation but also to a DCI format for a UL grant due to coverage and the like. In this case, if the base station uses two PDCCH candidates among the total number of available PDCCH candidates corresponding to 2 as UL grants, the remaining number of PDCCH candidates for performing DL allocation may become 0.

Hence, as mentioned earlier in the method 16, the present invention proposes a method of separating an SS of a DCI format for performing DL allocation from an SS of a DCI format for a UL grant.

As an additional example of the method 16 of the present invention, if a scheduling cell (or a scheduling carrier) for DL allocation is different from a scheduling cell for a UL grant (e.g., cross-carrier scheduling +self-carrier scheduling), an SS of a DCI format for performing DL allocation and an SS of a DCI format for a UL grant can be configured using one of methods described in the following.

1) If it is not assumed that SSs are separated between a DCI format for performing DL allocation and a DCI format for a UL grant (i.e., if sharing of an SS is assumed), in case of a DCI format corresponding to a cross-carrier scheduling target according to a CA (carrier aggregation) operation, SS per carrier can be separated from each other according to a CIF (carrier indicator field).

2) If it is assumed that SSs are separated between a DCI format for performing DL allocation and a DCI format for a UL grant, in case of a DCI format corresponding to a cross-carrier scheduling target according to a CA (carrier aggregation) operation, SS per carrier can be separated from each other according to a CIF.

In summary, according to an additional example of the method 16, if it is assumed that SSs are separated from each other between a DCI format for performing DL allocation and a DCI format for a UL grant, a base station or a UE applies an additional offset to a starting CCE index of each of the DCI formats and can apply a starting CCE index offset per SS according to a CIF. On the contrary, if it is not assumed that SSs are separated from each other between a DCI format for performing DL allocation and a DCI format for a UL grant, a base station or a UE may apply a starting CCE index offset per SS according to a CIF while the additional offset is not applied.

As an additional example of the method 16, when an offset is applied between a starting CCE index of an SS of a DCI format for performing DL allocation and a starting CCE index of an SS of a DCI format for a UL grant, the offset can be configured as follows. In the following description, $M^{(L)}$ corresponds to a BD count for an aggregation level L (or the number of (E)PDCCH candidates).

More specifically, the offset applied between the starting CCE indexes of the two SSs (as a cross-carrier scheduling target on a carrier on which the DCI format for performing DL allocation and the DCI format for the UL grant are transmitted) can be configured in proportion to the number of carriers set to a UE. For example, when the number of carriers corresponds to N, a value corresponding to $N*M^{(L)}$ can be configured as an offset.

In LTE system according to an embodiment of the present invention, if cross-carrier scheduling is performed on a plurality of SCells (within a licensed band) in DL and UL in a Pcell, as shown in Table 3, a starting CCE index of an SS for a specific Scell can be configured in proportion to a CIF (carrier indicator field) value for each Scell.

TABLE 3

The set of PDCCH candidates to monitor are defined in terms of search spaces, where a search space $S_k^{(L)}$ at aggregation level $L \in \{1,2,4,8\}$ is defined by a set of PDCCH candidates. For each serving cell on which PDCCH is monitored, the CCEs corresponding to PDCCH candidate m of the search space $S_k^{(L)}$ are given by $L \{(Y_k + m') \bmod \lfloor N_{CCE,k}/L \rfloor\} + i$ TABLE 3-continued where $Y_k$ is defined below, i = 0, . . . , L − 1. For the common search space m' = m. For the PDCCH UE specific search space, for the serving cell on which PDCCH is monitored, if the monitoring UE is configured with carrier indicator field then m' = m + $M^{(L)} \cdot n_{CI}$ where $n_{CI}$ is the carrier indicator field value, else if the monitoring UE is not configured with carrier indicator field then m' = m, where m = 0, . . . , $M^{(L)}$ − 1. $M^{(L)}$ is the number of PDCCH candidates to monitor in the given search space.

In Table 3, L indicates an aggregation level, $Y_k$ is defined by an equation in the following, and $N_{CCE,k}$ denotes the total number of CCEs in a control region of a subframe k.

$$Y_k = (A \cdot Y_{5-1}) \bmod D \quad [\text{Equation 1}]$$

In this case, $Y_{-1} = n_{RNTI} \neq 0$, A=39827, D=65537, and k=$\lfloor n_s/2 \rfloor$ are satisfied. $n_s$ corresponds to a slot number in a radio frame and $n_{RNTI}$ corresponds to a value indicating an ID value for a UE.

In particular, in LAA system to which the present invention is applicable, discussion on a method of transmitting a plurality of UL grants in a single subframe is in progress. Hence, as mentioned earlier in the method 16, in order to solve a DCI block problem between DL allocation and a UL grant, in LAA Scell, an SS of a DCI format (DL DCI) for performing DL allocation can be separated from an SS of a DCI format (UL DCI) for a UL grant. In this case, as shown in Table 3, if a starting CCE index of an SS is set to the LAA Scell to which the SS separation is applied, the starting CCE index of the SS may have an offset as much as $M^{(L)}$ for two SCells (e.g., CC1, CC2) adjacent to each other in the aspect of a CIF.

However, in case of the LAA Scell, a length (of an SS) occupying a CCE index region may correspond to $2*M^{(L)}$ due to the SS separation between DL and UL. For example, if an SS for UL DCI is positioned immediately after an SS for DL DCI, since the SS for UL DCI of the $CC_1$ is overlapped with the SS for DL DCI of the $CC_2$, a DCI blocking problem may occur. The DCI blocking problem can be solved in a manner that a base station sets an offset between the SS for DL DCI and the SS for UL DCI to a UE in proportion to the number of carriers (configured as a cross-carrier scheduling target).

In case of a carrier of which an SS of a DCI format for performing DL allocation is separated from an SS of a DCI format for a UL grant, the SS of the DCI format for performing DL allocation is determined according to an operation of Table 3 and the SS of the DCI format for the UL grant can be determined by applying an offset to an no value of Table 3. In this case, the offset can be determined by adding α to a biggest CIF value among CIF values of carriers set to a UE (as a target of cross-carrier scheduling on a carrier on which the DCI format for performing DL allocation and the DCI format for UL grant are transmitted). Specifically, the α may correspond to a value equal to or greater than 0. In particular, an offset between a starting CCE index of an SS of a DCI format for performing DL allocation and a starting CCE index of an SS of a DCI format for a UL grant may correspond to (maximum CIF value for configured carriers +α)*$M^{(L)}$.

Or, as mentioned earlier in the method 16, when an SS of a DCI format for performing DL allocation is separated from an SS of a DCI format for a UL grant in Scells and the SCells are cross-carrier scheduled from a single Pcell, if the number of PDCCH candidates for a specific aggregation level L corresponds to $M^{(L)}$, a starting CCE index difference of an SS between adjacent SCells can be configured by $2*M^{(L)}$ in the aspect of a carrier index.

Or, in the operation according to the method 16, a method of determining an SS of a DCI format for performing DL allocation and a method of determining an SS of a DCI format for a UL grant can be exchanged. In other word, the method of determining the SS of the DCI format for performing DL allocation can be applied to determine the SS of the DCI format for the UL grant and the method of determining the SS of the DCI format for the UL grant can be applied to determine the SS of the DCI format for performing DL allocation.

As an additional example, when an SS of a DCI format for performing DL allocation is separated from an SS of a DCI format for a UL grant in a specific UE, the UE may assume a BD operation described in the following as a default operation before additional configuration information is received. In this case, a base station may assume BD operations described in the following in response to the operation of the UE.

1) apply a default BD reduction ratio to a specific DCI format(s) (e.g., DCI format 1A, DCI format 0A)

2) assume that a specific DCI format(s) (e.g., DCI format 1A) is disabled.

In this case, when the SS of the DCI format for performing DL allocation is separated from the SS of the DCI format for the UL grant, the SS separation may correspond to separation in the aspect of a CCE index or separation of carriers on which DCI is transmitted.

The DCI format 0A corresponds to a DCI format for performing UL scheduling on a single subframe in LAA Scell.

More specifically, DL scheduling DCI for LAA Scell is transmitted in the LAA Scell in a form of self-carrier scheduling and UL scheduling DCI can be transmitted in a Pcell of a licensed band in a form of cross-carrier scheduling.

In LTE release-13 system according to an embodiment of the present invention, it may apply a method of identically setting a DCI size to a DCI format 1A for performing DL scheduling and a DCI format 0 for performing UL scheduling and a method of sharing an SS for each DCI format (i.e., a UE performs BD on two DCI formats one time only). However, as mentioned in the foregoing description, if a scheduling carrier is different between DL DCI and UL DCI, it is necessary for a UE to perform BD on the DCI format 1A and the DCI format 0, respectively. If the case above is compared with a case that DL DCI and UL DCI are transmitted on the same carrier, it is able to see that a BD count of a UE increases.

Hence, although a UE does not receive any separate configuration information on BD reduction from a base station, the present invention proposes a method for the UE to assume and apply a BD reduction ratio to a specific DCI format(s) as a default operation. In this case, a value predetermined between the base station and the UE can be applied as a default BD reduction ratio. Or, the UE may assume that a specific DCI format (e.g., DCI format 1A) is disabled and may not perform BD corresponding to the specific DCI format. For example, due to the characteristic of LAA Scell, the UE is able to receive important information from a Pcell. Hence, if there is no additional configuration information, as a default operation, the UE may assume that the DCI format 1A is disabled.

3.17. Method 17

When a base station indicates scheduling of a plurality of consecutive UL subframes using single DCI and sets a transmission gap (or in-between TX gap) to the inside of the consecutive UL subframes, the base station and a UE may operate as follows.

(1) The base station can configure in-between TX gap only when consecutive UL subframes (scheduled by single DCI) are included within MCOT (of which a fixed LBT operation is permitted by UL LBT).

(2) The UE can perform a fixed LBT operation on in-between TX gap within consecutive UL subframes (scheduled by single DCI). In this case, the fixed LBT operation may correspond to a single CCA slot (e.g., 25 us) based LBT operation.

(3) The UE assumes a length of in-between TX gap within consecutive UL subframes (scheduled by single DCI) as follows and may be able to perform PUSCH transmission after the in-between TX gap.

1) a fixed value (e.g., 25 us)
2) a value separately configured by the base station via higher layer signaling (e.g., RRC)
3) a length of a transmission gap indicated by DCI in a first subframe is identically applied.

In this case, the in-between TX gap corresponds to a transmission gap configured by excluding a forepart of time domain of a first subframe and a rear part of the last subframe or a transmission gap configured between subframes.

As mentioned earlier in the method 6 of the present invention, when a base station schedules one or more (consecutive) UL subframes using MSF (multi-subframe scheduling) DCI, if in-between transmission gap is configured, it is necessary to define an LBT operation of a UE for the transmission gap. In this case, if an independent LBT parameter is configured in every in-between TX gap, it is not preferable in terms of DCI signaling overhead. Hence, it is preferable to apply a fixed LBT operation capable of operating without a separate LBT parameter as an LBT operation corresponding to the in-between transmission gap.

However, if a UE always performs a fixed LBT operation in the in-between transmission gap, it is unfair in consideration of fairness with a different node (e.g., Wi-Fi). In particular, according to an additional example of the present invention, a base station configures in-between transmission gap only when consecutive UL subframes scheduled by the MSF DCI are included in the same UL MCOT and the base station can configure a UE to perform a fixed LBT in the in-between transmission gap only. For example, a single CCA slot based LBT operation based on 25 us CCA slot can be applied as the fixed LBT operation.

3.18. Method 18

When cross-carrier scheduling is performed on a plurality of second carriers (e.g., Scell) on a specific first carrier, a base station or a UE can determine a starting CCE index for a search space (for an aggregation level L) of a second carrier having a specific CI (carrier indicator) value (=$n_{CI}$) as follows.

A base station or a UE can determine a starting CCE index for a search space (for an aggregation level L) of a specific carrier (e.g., a carrier of which a CI value corresponds to $n_{CI}$) by applying a starting CCE index offset corresponding to the sum of PDCCH candidate maximum values of a plurality of DCI formats set to carriers corresponding to CI values ranging from 0 to $n_{CI}-1$.

TABLE 4

The set of PDCCH candidates to monitor are defined in terms of search spaces, where a search space $S_k^{(L)}$ at aggregation level L ∈ {1,2,4,8} is defined by a set of PDCCH candidates. For each serving cell on which PDCCH is monitored, the CCEs corresponding to PDCCH candidate m of the search space $S_k^{(L)}$ are given by
L {($Y_k$ + m')mod⌊$N_{CCE,k}$/L⌋} + i
where $Y_k$ is defined below, i = 0, . . . , L − 1. For the common search space, m' = m. For the PDCCH UE specific search space, for the serving cell on which PDCCH is monitored, if the monitoring UE is configured with carrier indicator field then m' = m + $M^{(L)}$ · $n_{CI}$ where $n_{CI}$ is the carrier indicator field value, else if the monitoring UE is not configured with carrier indicator field then m' = m, where m = 0, . . . , $M^{(L)}$ − 1. $M^{(L)}$ is the number of PDCCH candidates to monitor in the given search space.

In Table 4, L indicates an aggregation level, $Y_k$ is defined by an equation in the following, and $N_{CCE,k}$ denotes the total number of CCEs in a control region of a subframe k.

$$Y_k = (A \cdot Y_{k-1}) \bmod D \qquad \text{[Equation 2]}$$

In this case, $Y_{-1} = n_{RNTI} \neq 0$, A=39827, D=65537, and k=⌊$n_s/2$⌋ are satisfied. $n_s$ corresponds to a slot number in a radio frame and $n_{RNTI}$ corresponds to a value indicating an ID value for a UE.

In LTE system according to an embodiment of the present invention, when a base station performs cross-carrier scheduling on a plurality of subcarriers (e.g., Scell) (within a licensed band) in DL and/or UL on a specific carrier (e.g., Pcell), as shown in Table 4, a starting CC index of an SS for a specific subcarrier can be configured in proportion to a CIF (carrier indicator field) value for each subcarrier.

More specifically, in Table 4, $M^{(L)}$ corresponds to the number of PDCCH candidates for an aggregation level L for a carrier of which a CI (carrier indicator) value corresponds to $n_{CI}$ and m'=m+$M^{(L)}$·$n_{CI}$ corresponds to an offset value for a starting CCE index of an SS according to each carrier. The offset value enables search spaces between consecutive carriers having $n_{CI}$ to be arranged without being overlapped.

However, according to an embodiment of the present invention, BD (blind detection) adjustment per DCI format can be applied to specific DCI formats in LAA Scell. Hence, the number of PDCCH candidates for a specific aggregation level L may vary depending on a CI and a DCI format. In particular, as mentioned in the foregoing description, when the number of PDCCH candidates varies according to a carrier or a DCI format for specific SCells, the present invention proposes a method of newly introducing a variable $M^{(L)}_{n\_CI}$ capable of being changed according to no in consideration of a change of the number of PDCCH candidates according to a carrier and a method of defining the $M^{(L)}_{n\_CI}$ in consideration of the number of PDCCH candidates that varies among a plurality of DCI formats in a carrier. The $M^{(L)}_{n\_CI}$ can be defined as follows.

(1) Maximum value among the numbers of PDCCH candidates of a plurality of DCI formats set to a UE for an aggregation level L (for a carrier of which CI value corresponds to $n_{CI}$).

In this case, if BD adjustment is set to the DCI format, the number of PDCCH candidates may correspond to a value to which BD adjustment is applied.

(2) Maximum value among the numbers of PDCCH candidates of a plurality of DCI formats capable of being set to a UE for an aggregation level L (for a carrier of which CI value corresponds to $n_{CI}$).

In this case, if BD adjustment is set to the DCI format, the number of PDCCH candidates may correspond to a value to which BD adjustment is applied.

(3) Number of nominal PDCCH candidates (to which BD adjustment is not applied) for an aggregation level L (for a carrier of which CI value corresponds to $n_{CI}$).

(4) Minimum value among (1) and (3)

(5) Minimum value among (2) and (3)

In particular, according to a method proposed by the present invention, in the $m'=m+M^{(L)}n_{CI}$ of Table 4, m' (for a carrier of which a CI value corresponds to $n_{CI}$) can be applied in a manner of being changed.

$$m' = m + \begin{cases} \sum_{k=0}^{n_{CI}-1} M_k^{(L)} & n_{CI} > 0 \\ 0 & n_{CI} = 0 \end{cases}$$ [Equation 3]

For example, if Equation 3 is applied to Table 4, Table 4 can be modified as follows.

TABLE 5

The set of PDCCH candidates to monitor are defined in terms of search spaces, where a search space $S_k^{(L)}$ at aggregation level L ∈ {1, 2, 4, 8} is defined by a set of PDCCH candidates. For each serving cell on which PDCCH is monitored, the CCEs corresponding to PDCCH candidate m of the search space $S_k^{(L)}$ are given by $L \{(Y_k + m') \bmod \lfloor N_{CCE,k}/L \rfloor\} + i$ where $Y_t$ is defined below, i = 0, . . . , L − 1. For the common search space m' = m. For the PDCCH UE specific search space, for the serving cell on whih PDCCH is monitored, if the monitoring UE is configured with carrier indicator field then $m' = m + \begin{cases} \sum_{k=0}^{n_{CI}-1} M_k^{(L)} & n_{CI} > 0 \\ 0 & n_{CI} = 0 \end{cases}$ where $n_{CI}$ is the carrier indicator field value, else if the monitoring UE is not configured with carrier indicator field then m' = m, where m = 0, . . . , $M_{n_{CI}}^{(L)} - 1$. $M_{n_{CI}}^{(L)}$ is the number of PDCCH candidates to monitor in the given search space for carrier having $n_{CI}$.

Or, m' (for a carrier of which a CI value corresponds to $n_{CI}$) can be applied in a manner of being changed. In this case, $n_{CI, MAX}$ corresponds to the maximum value capable of being allocated by $n_{CI}$.

$m'=m+(\max\{M_0^{(L)},M_1^{(L)}, \ldots M_{n_{CI,MAX}}^{(L)}\}) \cdot n_{CI}$ [Equation 4]

For example, if Equation 4 is applied to Table 4, Table 4 can be modified as follows.

TABLE 6

The set of PDCCH candidates to monitor are defined in terms of search spaces, where a search space $S_k^{(L)}$ at aggregation level L ∈ {1,2,4,8} is defined by a set of PDCCH candidates. For each serving cell on which PDCCH is monitored, the CCEs corresponding to PDCCH candidate m of the search space $S_k^{(L)}$ are given by $L \{(Y_k + m') \bmod \lfloor N_{CCE,k}/L \rfloor\} + i$ where $Y_k$ is defined below, i = 0, . . . , L − 1. For the common search space m' = m. For the PDCCH UE specific search space, for the serving cell on which PDCCH is monitored, if the monitoring UE is configured with carrier indicator field then m' = m + $(\max\{M_0^{(L)}, M_1^{(L)}, \ldots M_{n_{CI,MAX}}^{(L)}\}) \cdot n_{CI}$ where $n_{CI}$ is the carrier indicator field value, else if the monitoring UE is not configured with carrier indicator field then m' = m, where m = 0, . . . , $M_{n_{CI}}^{(L)} - 1$. $M_{n_{CI}}^{(L)}$ is the number of PDCCH candidates to monitor in the given search space for carrier having $n_{CI}$.

And, the number of PDCCH candidates of a carrier corresponding to a CIF on which CA (carrier aggregation) is not actually performed or a value of $M^{(L)}_{n\_CI}$ can be allocated by '0' or a legacy nominal BD count to which BD adjustment is not applied can be allocated.

The proposed method of the present invention can be applied not only to a case of LAA Scell but also to a case that a cell performs cross-carrier scheduling on a different cell and the number of PDCCH candidates (for a specific aggregation level) varies according to a carrier and/or a DCI format. And, an operating principle proposed by the present invention can be extensively applied to EPDCCH. Table 7 in the following illustrates a method of defining a search space in case of EPDCCH.

TABLE 7

An EPDCCH UE-specific search space $ES_k^{(L)}$ at aggregation level $L \in \{1, 2, 4, 8, 16, 32\}$ is defined by a set of EPDCCH candidates.
For an EPDCCH-PRB-set p, the ECCEs corresponding to EPDCCH candidate m of the search space $ES_k^{(L)}$ are given by $$L\left\{\left(Y_{p,k} + \left\lfloor \frac{m \cdot N_{ECCE,p,k}}{L \cdot M_p^{(L)}} \right\rfloor + b\right) \mod \lfloor N_{ECCE,p,k}/L \rfloor\right\} + i$$

where
$Y_{p,k}$ is defined below,
$i = 0, \ldots, L - 1$
$b = n_{CI}$ if the UE is configured with a carrier indicator field for the serving cell on which EPDCCH is monitored, otherwise $b = 0$
$n_{CI}$ is the carrier indicator field value,
$m = 0, 1, \ldots M_p^{(L)} - 1$,
If the UE is not configured with a carrier indicator field for the serving cell on which EPDCCH is monitored, $M_p^{(L)}$ is the number of EPDCCH candidates to monitor at aggregation level L in EPDCCH-PRB-set p for the serving cell on which EPDCCH is monitored, as given in Tables 9.1.4-1a, 9.1.4-1b, 9.1.4-2a, 9.1.4-2b, 9.1.4-3a, 9.1.4-3b, 9.1.4-4a, 9.4.4-4b, 9.1.4-5a, 9.1.4-5b below; otherwise, $M_p^{(L)}$ is the number of EPDCCH candidates to monitor at aggregation level L in EPDCCH-PRB-set p for the serving cell indicated by $n_{CI}$.

In Table 7, L indicates an aggregation level, $Y_{p,k}$ is defined by an equation in the following, and $N_{ECCE,p,k}$ denotes the total number of ECCEs in an EPDCCH-PRB-set p of a subframe k.

$$Y_{p,k} = (A_p \cdot Y_{p,k-1}) \mod D \quad \text{[Equation 5]}$$

In this case, $Y_{p,-1} = n_{RNTI} \neq 0$, $A_0 = 39827$, $A = 39829$, $D = 65537$, and $k = \lfloor n_s/2 \rfloor$ are satisfied. $n_s$ corresponds to a slot number in a radio frame and $n_{RNTI}$ corresponds to a value indicating an ID value for a UE.

The present invention proposes a method of newly defining $M_{p,n\_CI}^{(L)}$ corresponding to a variable capable of being changed according to no in consideration of a change of the number of EPDCCH candidates according to a carrier. And, the $M_{p,n\_CI}^{(L)}$ can be defined as follows in consideration of the number of EPDCCH candidates which is different among a plurality of DCI formats in a carrier.

1) Maximum value among the numbers of EPDCCH candidates of a plurality of DCI formats set to a UE for an aggregation level L (for EPDCCH-PRB-set p of a carrier of which CI value corresponds to $n_{CI}$).

In this case, if BD adjustment is set to the DCI format, the number of EPDCCH candidates may correspond to a value to which BD adjustment is applied.

2) Maximum value among the numbers of EPDCCH candidates of a plurality of DCI formats capable of being set to a UE for an aggregation level L (for EPDCCH-PRB-set p of a carrier of which CI value corresponds to $n_{CI}$).

In this case, if BD adjustment is set to the DCI format, the number of EPDCCH candidates may correspond to a value to which BD adjustment is applied.

3) Number of nominal EPDCCH candidates (to which BD adjustment is not applied) for an aggregation level L (for EPDCCH-PRB-set p of a carrier of which CI value corresponds to $n_{CI}$).

4) Minimum value among (1) and (3)

5) Minimum value among (2) and (3)

In particular, according to the method proposed by the present invention, it may apply $M_{p,n\_CI}^{(L)}$ instead of $M_p^{(L)}$ of Table 7. Hence, Table 7 can be modified as follows.

TABLE 8

An EPDCCH UE-specific search space $ES_k^{(L)}$ at aggregation level $L \in \{1, 2, 4, 8, 16, 32\}$ is defined by a set of EPDCCH candidates.
For an EPDCCH-PRB-set p, the ECCEs corresponding to EPDCCH candidate m of the search space $ES_k^{(L)}$ are given by $$L\left\{\left(Y_{p,k} + \left\lfloor \frac{m \cdot N_{ECCE,p,k}}{L \cdot M_{p,n_{CI}}^{(L)}} \right\rfloor + b\right) \mod \lfloor N_{ECCE,p,k}/L \rfloor\right\} + 1$$

where
$Y_{p,k}$ is defined below,
$i = 0, \ldots, L - 1$
$b = n_{CI}$ if the UE is configured with a carrier indicator field for the serving cell on which EPDCCH is monitored, otherwise $b = 0$
nCI is the carrier indicator field value,
$m = 0, 1, \ldots M_{p,n_{CI}}^{(L)}$
If the UE is not configured with a carrier indicator field for the serving cell on which EPDCCH is monitored, $M_p^{(L)}$ is the number of EPDCCH candidates to monitor at aggregation level L in EPDCCH-PRB-set p for the serving cell on which EPDCCH is monitored, as given in Tables 9.1.4-1a, 9.1.4-1b, 9.1.4-2a, 9.1.4-2b, 9.1.4-3a, 9.1.4-3b, 9.1.4-4a, 9.4.4-4b, 9.1.4-5a, 9.1.4-5b below; otherwise, $M_p^{(L)}$ is the number of EPDCCH candidates to monitor at aggregation level L in EPDCCH-PRB-set p for the serving cell indicated by $n_{CI}$.

aggregation level L (for EPDCCH-PRB-set p of a carrier of which CI value corresponds to $n_{CI}$).

In this case, if BD adjustment is set to the DCI format, the number of EPDCCH candidates may correspond to a value to which BD adjustment is applied.

Or, it may apply $M_{p,NEW}^{(L)}$ instead of $M_p^{(L)}$ of Table 7. In this case, $n_{CI,MAX}$ corresponds to the maximum value capable of being allocated by $n_{CI}$.

$$M_{p,NEW}^{(L)} = \max\{M_{p,0}^{(L)}, \ldots M_{p,n_{CI,MAX}}^{(L)}\} \quad \text{[Equation 6]}$$

For example, if equation 6 is applied to Table 7, Table 7 can be modified as follows.

TABLE 9

An EPDCCH UE-specific search space $ES_k^{(L)}$ at aggregation level $L \in \{1, 2, 4, 8, 16, 32\}$ is defined by a set of EPDCCH candidates.
For an EPDCCH-PRB-set p, the ECCEs corresponding to EPDCCH candidate m of the search space $ES_k^{(L)}$ are given by $$L\left\{\left(Y_{p,k} + \left\lfloor \frac{m \cdot N_{ECCE,p,k}}{L \cdot M_{p,NEW}^{(L)}} \right\rfloor + b\right) \mod \lfloor N_{ECCE,p,k}/L \rfloor\right\} + i$$

where
$Y_{p,k}$ is defined below,
$i = 0, \ldots, L - 1$
$b = n_{CI}$ if the UE is configured with a carrier indicator field for the serving cell on which EPDCCH is monitored, otherwise $b = 0$
nCI is the carrier indicator field value,
$m = 0, 1, \ldots M_{p,NEW}^{(L)}$
If the UE is not configured with a carrier indicator field for the serving cell on which EPDCCH is monitored, $M_p^{(L)}$ is the number of EPDCCH candidates to monitor at aggregation level L in EPDCCH-PRB-set p for the serving cell on which EPDCCH is monitored, as given in Tables 9.1.4-1a, 9.1.4-1b, 9.1.4-2a, 9.1.4-2b, 9.1.4-3a, 9.1.4-3b, 9.1.4-4a, 9.4.4-4b, 9.1.4-5a, 9.1.4-5b below; otherwise, $M_p^{(L)}$ is the number of EPDCCH candidates to monitor at aggregation level L in EPDCCH-PRB-set p for the serving cell indicated by $n_{CI}$.

According to the method proposed by the present invention, it is able to make search spaces not to be overlapped between carriers including a different CI.

In addition, when search spaces for a plurality of cells (on which cross-carrier scheduling is to be performed) coexist in a PDCCH region, a starting CCE index of a search space (for a specific aggregation level) can be defined according to a cell index corresponding to an indicator capable of being allocated to a plurality of the cells. In this case, specifically, a search space (for a specific aggregation level) of a cell index k+1 can be determined as follows.

Specifically, a starting CCE index of a search space (for a specific aggregation level) of a cell index K+1 can be determined by X+M*(number of CCEs corresponding to the specific aggregation level) on the basis of a starting CCE index X of a search space (for the specific aggregation level) of a cell index k. In this case, the M may correspond to one of values described in the following.

1> Number of nominal PDCCH candidates (for a specific aggregation number)

In this case, the number of nominal PDCCH candidates corresponds to the number of PDCCH candidates to which a change of the number of PDCCHs according to BD adjustment is not reflected.

2> Number of (configured) PDCCH candidates of a cell index k (for a specific aggregation level)

In this case, the number of PDCCH candidates may correspond to the maximum value among the numbers of PDCCH candidates (to which a change of the number of PDCCHs according to BD adjustment configured via higher layer signaling is reflected) for a (configured) plurality of DCI formats.

3> The maximum number of PDCCH candidates (configured or capable of being configured) (for a specific aggregation level)

In this case, the maximum number of PDCCH candidates may correspond to the maximum number among the numbers of PDCCH candidates (for a specific aggregation level) (configured or capable of being configured) for DCI formats of a plurality of cells (on which cross-carrier scheduling is to be performed).

4> minimum value or maximum value among 1> and 2>
5> minimum value or maximum value among 1> and 3>

In particular, 5> may corresponds to the maximum value among the numbers of PDCCH candidates (for a specific aggregation level) corresponding to a cell index for the entire cell indexes. More specifically, 5> may correspond to a different value depending on whether or not a cell corresponding to a cell index exists. For example, if a cell corresponding to a cell index exists, the number of PDCCH candidates corresponding to the cell index can indicate the maximum value among the numbers of PDCCH candidates (for a specific aggregation level) (configured or capable of being configured) for DCI formats in the cell. If a cell corresponding to a cell index does not exist, it may apply the number of nominal PDCCH candidates (for a specific aggregation level) as the number of PDCCH candidates corresponding to the cell index.

In particular, a search space of a cell can be configured by a series of CCEs consecutive from a starting CCE index.

In addition, when search spaces for a plurality of cells (on which cross-carrier scheduling is to be performed) coexist in an EPDCCH region, a starting CCE index of a search space (for a specific aggregation level) can be defined according to a cell index corresponding to an indicator capable of being allocated to a plurality of the cells. In this case, specifically, a search space (for a specific aggregation level) of a cell index k+1 can be determined as follows.

Specifically, a starting ECCE index of a search space (for a specific aggregation level) of a cell index K+1 can be determined by X+(number of ECCEs corresponding to the specific aggregation level) on the basis of a starting ECCE index X of a search space (for the specific aggregation level) of a cell index k.

In this case, in case of EPDCCH, a starting ECCE index for each of EPDCCH candidates in a search space (for a specific aggregation level) of EPDCCH PRB set for a specific cell can be determined as follows.

Specifically, a starting ECCE index of $(m+1)^{th}$ EPDCCH candidate can be determined by Y+floor{(total number of ECCEs in EPDCCH PRB set)/(M*(number of ECCEs corresponding to the specific aggregation level))} on the basis of a starting ECCE index Y of an $m^{th}$ EPDCCH candidate. In this case, M can be applied by one of values described in the following.

1>> Number of nominal EPDCCH candidates (for a specific aggregation number)

In this case, the number of nominal EPDCCH candidates corresponds to the number of EPDCCH candidates to which a change of the number of EPDCCHs according to BD adjustment is not reflected.

2>> Number of EPDCCH candidates (configured) in EPDCCH PRB set (for a specific aggregation level)

In this case, the number of EPDCCH candidates may correspond to the maximum value among the numbers of EPDCCH candidates (to which a change of the number of EPDCCH according to BD adjustment is reflected) for a (configured) plurality of DCI formats.

3>> The maximum number of EPDCCH candidates (configured or capable of being configured) in EPDCCH PRB set (for a specific aggregation level)

In this case, the maximum number of EPDCCH candidates may correspond to the maximum value among the numbers of EPDCCH candidates (for a specific aggregation level) (configured or capable of being configured) for DCI formats of a plurality of cells (on which cross-carrier scheduling is to be performed) in EPDCCH PRB set.

4>> minimum value or maximum value among 1>> and 2>>

5>> minimum value or maximum value among 1>> and 3>>

In particular, 5>> may corresponds to the maximum value among the numbers of EPDCCH candidates (for a specific aggregation level) corresponding to a cell index for the entire cell indexes. More specifically, 5>> may correspond to a different value depending on whether or not a cell corresponding to a cell index exists. For example, if a cell corresponding to a cell index exists, the number of EPDCCH candidates corresponding to the cell index can indicate the maximum value among the numbers of EPDCCH candidates (for a specific aggregation level) (configured or capable of being configured) for DCI formats in the cell. If a cell corresponding to a cell index does not exist, it may apply the number of nominal EPDCCH candidates (for a specific aggregation level) as the number of EPDCCH candidates corresponding to the cell index.

If LAA UL transmission is set to a UE, the UE can apply the aforementioned method 18 to all cross-carrier scheduling cells (in the following, this configuration is referred to as an option 1). Or, the method 18 can be applied to a cross-carrier scheduling cell(s) in which LAA Scell is included only among cross-carrier scheduling cell(s) (i.e., cross-carrier scheduling cell(s) performing scheduling on UL transmission) (in the following, this configuration is referred to as an option 2).

For example, when cross-carrier scheduling is set to licensed carriers only on a licensed band #1 (or licensed carrier #1) and cross-carrier scheduling is set not only to a licensed carrier but also to LAA Scell UL transmission on a licensed band #2 (or licensed carrier #2), according to the option 1, the method 18 can be applied to the licensed band #1 and the licensed band #2. According to the option 2, the method 18 can be applied to the licensed band #2 only.

According to the present invention, a UE can receive DCI from a base station according to a method described in the following.

First of all, the UE configures a search space to receive a downlink signal from the base station via a first unlicensed band among a plurality of unlicensed bands.

Subsequently, the UE receives DCI by monitoring the configured search space.

In this case, a search space for a specific aggregation level among the configured search space is determined based on the maximum number of candidates among the numbers of candidates of a downlink control channel for the specific aggregation level according to all downlink control information (DCI) formats set to one or more unlicensed bands among unlicensed bands including the first unlicensed band.

In this case, if the downlink control channel corresponds to a physical downlink control channel (PDCCH), the search space for the specific aggregation level among the configured search space can be determined based on the maximum number of candidates among the number of PDCCH candidates for the specific aggregation level according to all DCI formats set to one or more second unlicensed bands having a carrier indicator smaller than a carrier indicator of the first unlicensed band.

More specifically, if the downlink control channel corresponds to a physical downlink control channel (PDCCH), the search space for the specific aggregation level among the configured search space can be determined based on the sum of the maximum number of candidates among the number of PDCCH candidates for the specific aggregation level according to all DCI formats set to all second unlicensed bands having a carrier indicator smaller than a carrier indicator of the first unlicensed band.

Specifically, the search space for the specific aggregation level among the configured search space can be determined based on a value determined by equation 7.

$$\sum_{k=0}^{n_{CI}-1} M_k^{(L)}$$ [Equation 7]

In this case, nCI indicates a carrier indicator for the first unlicensed band and Mk(L) can indicate the maximum number of candidates among the number of PDCCH candidates of which an aggregation level according to all DCI formats set to the second unlicensed band having a carrier indicator k corresponds to L.

As a different example, if the downlink control channel corresponds to an enhanced physical downlink control channel (EPDCCH), the search space for the specific aggregation level among the configured search space can be determined based on the maximum number of candidates among the numbers of PDCCH candidates for the specific aggregation level according to all DCI formats set to all unlicensed bands including the first unlicensed band.

More specifically, the search space for the specific aggregation level among the configured search space can be determined based on a value determined by equation 8.

$$M_{p,NEW}^{(L)} = \max\{M_{p,0}^{(L)}, \ldots M_{p,n_{CI,MAX}}\}$$ [Equation 8]

In this case, no MAX indicates a maximum value capable of being indicated by a carrier indicator, and $M_{p,k}^{(L)}$ can indicate the maximum number of candidates among the numbers of EPDCCH candidates of which an aggregation level corresponds to L according to all DCI formats set to an unlicensed band having a carrier indicator k.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB informs a UE of information on whether to apply the proposed methods (or, information on rules of the proposed methods) via a predefined signal (e.g., physical layer signal or higher layer signal).

4. Device Configuration

Figure 14:
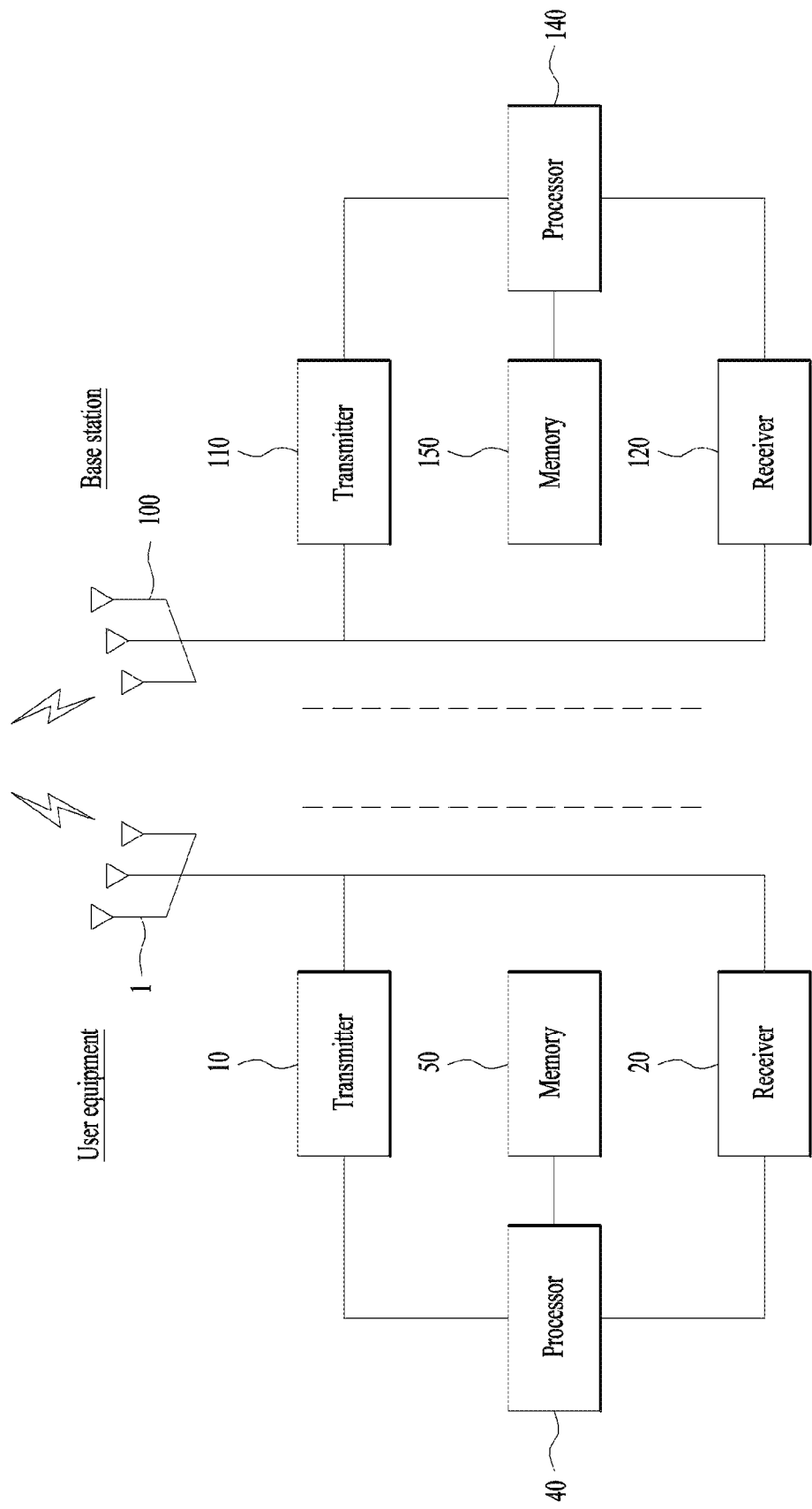
FIG. 14 is a diagram illustrating configurations of a UE and a base station in which proposed embodiments are implementable.

FIG. 14 is a diagram illustrating configurations of a UE and a base station capable of being implemented by the embodiments proposed in the present invention. The UE and the base station shown in FIG. 14 operate to implement the embodiments of a method of transmitting and receiving a downlink control information between the UE and the base station.

A UE 1 may act as a transmission end on a UL and as a reception end on a DL. A base station (eNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE configures a search space for receiving a downlink signal from the base station via a first unlicensed band through the processor 40, monitors the search space, and can be configured to receive downlink control information. In this case, a search space for a specific aggregation level among the configured search space can be determined based on the maximum number of candidates among the numbers of candidates of a downlink control channel for the specific aggregation level according to all downlink control information (DCI) formats set to one or more unlicensed bands among unlicensed bands including the first unlicensed band.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 14 may further include a low-power Radio Frequency (RF)/ Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The embodiments of the present invention can be applied to various wireless access systems including 3GPP (3rd Generation Partnership Project) and 3GPP2 system. The embodiments of the present invention can be applied not only to various wireless access systems but also to all technical fields to which the various wireless access systems are applied. Further, the proposed method can also be applied to an mmWave communication system using ultra-high frequency band.

What is claimed is:

1. A method of receiving downlink control information by a user equipment from a base station in a wireless communication system supporting an unlicensed band, the method comprising:
    monitoring a first search space for receiving a downlink control channel from the base station via a first unlicensed band; and
    receiving, through the downlink control channel, the downlink control information by monitoring the first search space,
    wherein a second search space for a specific aggregation level is included in the first search space,
    wherein based on that the downlink control channel is a physical downlink control channel (PDCCH), the second search space is determined based on a carrier indicator and a maximum number of candidates among PDCCH candidates for the specific aggregation level over all downlink control information (DCI) formats configured for one or more unlicensed bands, and
    wherein based on that the downlink control channel is an enhanced physical downlink control channel (EPDCCH), the second search space is determined based on the carrier indicator and the maximum number of candidates among EPDCCH candidates for the specific aggregation level over all DCI formats configured for all unlicensed bands comprising the first unlicensed band.

2. The method of claim 1, wherein based on that the downlink control channel is the PDCCH, the one or more unlicensed bands corresponds to one or more second unlicensed bands having the carrier indicator smaller than the first unlicensed band.

3. The method of claim 2, wherein based on that the downlink control channel is the PDCCH, the second search space is determined based on a sum of the maximum number of candidates among PDCCH candidates for the specific aggregation level over all DCI formats configured for all second unlicensed bands.

4. The method of claim 3, wherein the second search space is determined based on a value satisfying an equation in the following, $$\sum_{k=0}^{n_{CI}-1} M_k^{(L)}$$ [Equation]

wherein $n_{CI}$ indicates the carrier indicator for the first unlicensed band, and wherein $M_k^{(L)}$ indicates the maximum number of candidates among the PDCCH candidates for an aggregation level corresponding to L over all DCI formats configured for a third unlicensed band having a carrier indicator k.

5. The method of claim 1, wherein the second search space is determined based on $M_{p,NEW}^{(L)}$ satisfying an equation in the following, $$M_{p,NEW}^{(L)} = \max\{M_{p,0}^{(L)}, M_{p,1}^{(L)}, \ldots M_{p,n_{CI,MAX}}^{(L)}\}$$ [Equation]

wherein $n_{CI\_MAX}$ indicates a maximum value capable of being indicated by the carrier indicator, and wherein $M_{p,k}^{(L)}$ indicates the maximum number of candidates among EPDCCH candidates for an aggregation level corresponding to L over all DCI formats configured for an unlicensed band having a carrier indicator k.

6. A user equipment configured to receive downlink control information from a base station in a wireless communication system supporting an unlicensed band, the user equipment comprising:
 a receiver;
 a transmitter;
 at least one processor; and
 at least one computer memory operably connectable to the at least one processor and storing instructions that, based on being executed by the at least one processor, perform operations comprising:
 monitoring a first search space for receiving a downlink control channel from the base station via a first unlicensed band; and
 receiving, through the receiver, downlink control information by monitoring the first search space,
 wherein a second search space for a specific aggregation level is included in the first search space,
 wherein based on that the downlink control channel is a physical downlink control channel (PDCCH), the second search space is determined based on a carrier indicator and a maximum number of candidates among PDCCH candidates for the specific aggregation level over all downlink control information (DCI) formats configured for one or more unlicensed bands, and
 wherein based on that the downlink control channel is an enhanced physical downlink control channel (EPDCCH), the second search space is determined based on the carrier indicator and the maximum number of candidates among EPDCCH candidates for the specific aggregation level over all DCI formats configured for all unlicensed bands comprising the first unlicensed band.

7. The user equipment of claim 6, wherein based on that the downlink control channel is the PDCCH, the one or more unlicensed bands corresponds to one or more second unlicensed bands having the carrier indicator smaller than the first unlicensed band.

8. The user equipment of claim 7, wherein based on that the downlink control channel is the PDCCH, the second search space is determined based on a sum of the maximum number of candidates among PDCCH candidates for the specific aggregation level over all DCI formats configured for all second unlicensed bands.

9. The user equipment of claim 8, wherein the second search space is determined based on a value satisfying an equation in the following, $$\sum_{k=0}^{n_{CI}-1} M_k^{(L)}$$ [Equation]

wherein $n_{CI}$ indicates the carrier indicator for the first unlicensed band, and wherein $M_k^{(L)}$ indicates the maximum number of candidates among the PDCCH candidates for an aggregation level corresponding to L over all DCI formats configured for a third unlicensed band having a carrier indicator k.

10. The user equipment of claim 6, wherein the second search space is determined based on $M_{p,NEW}^{(L)}$ satisfying an equation in the following, $$M_{p,NEW}^{(L)} = \max\{M_{p,0}^{(L)}, M_{p,1}^{(L)}, \ldots M_{p,n_{CI,MAX}}^{(L)}\}$$ [Equation]

wherein $n_{CI\_MAX}$ indicates a maximum value capable of being indicated by the carrier indicator, and wherein $M_{p,k}^{(L)}$ indicates the maximum number of candidates among EPDCCH candidates for an aggregation level corresponding to L over all DCI formats configured for an unlicensed band having a carrier indicator k.

11. The method of claim 1, wherein a start position of the second search space is determined based on the maximum number of candidates among candidates for the specific aggregation level over all downlink control information (DCI) formats configured for the one or more unlicensed bands.

12. The user equipment of claim 6, wherein a start position of the second search is determined based on the maximum number of candidates among candidates for the specific aggregation level over all downlink control information (DCI) formats configured for the one or more unlicensed bands.

* * * * *